US010936660B2

(12) United States Patent
Johnson et al.

(10) Patent No.: US 10,936,660 B2
(45) Date of Patent: *Mar. 2, 2021

(54) DATABASE EVALUATION OF ANCHORED LENGTH-LIMITED PATH EXPRESSIONS

(71) Applicant: AT&T Intellectual Property I, L.P., Atlanta, GA (US)

(72) Inventors: Theodore Johnson, New York, NY (US); Vladislav Shkapenyuk, New York, NY (US); Yaron Kanza, Fair Lawn, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 223 days.

This patent is subject to a terminal disclaimer.

(21) Appl. No.: 16/257,539

(22) Filed: Jan. 25, 2019

(65) Prior Publication Data

US 2019/0155848 A1 May 23, 2019

Related U.S. Application Data

(63) Continuation of application No. 15/253,591, filed on Aug. 31, 2016, now Pat. No. 10,223,475.

(51) Int. Cl.
*G06F 16/901* (2019.01)
(52) U.S. Cl.
CPC .................. *G06F 16/9024* (2019.01)
(58) Field of Classification Search
CPC .................................................. G06F 16/9024
See application file for complete search history.

(56) References Cited

U.S. PATENT DOCUMENTS

| 5,802,508 A | 9/1998 | Morgenstern |
| 5,870,564 A | 2/1999 | Jensen et al. |

(Continued)

FOREIGN PATENT DOCUMENTS

| CA | 2200924 C | 2/2001 |
| EP | 2549697 A1 | 1/2013 |
| WO | WO 2007/095331 A2 | 8/2007 |

OTHER PUBLICATIONS

Nepal et al.; "Query Issues in Image(multimedia) Databases"; Data Engineering, 1999 Proceedings 15.sup.th Int'l Conference; 8 pages.

(Continued)

*Primary Examiner* — Jorge A Casanova
(74) *Attorney, Agent, or Firm* — BakerHostetler

(57) ABSTRACT

A method includes parsing a regular pathway expression into fragments including an anchored fragment and at least one other fragment. A number of the fragments is based on at least a length limitation of the regular pathway expression. The method includes generating an operator directed acyclic graph (DAG) including non-operator nodes, operator nodes, and a root based on at least the anchored fragment. The method includes removing, from the operator DAG, at least one of the non-operator nodes and connecting a first operator node to a second operator node of the operator nodes. The first operator node includes an edge into the at least one removed non-operator node, and the second operator node includes an edge from the at least one removed node. The method includes executing the operator DAG on a graph database to return a pathway set comprising at least one pathway that satisfies the regular pathway expression.

19 Claims, 20 Drawing Sheets

(56) References Cited

U.S. PATENT DOCUMENTS

| | | |
|---|---|---|
| 6,029,162 A | 2/2000 | Schultz |
| 6,219,833 B1 | 4/2001 | Solomon et al. |
| 6,778,970 B2 | 8/2004 | Au |
| 7,210,121 B2 | 4/2007 | Xia et al. |
| 7,408,881 B2 | 8/2008 | Acharya et al. |
| 7,447,667 B2 | 11/2008 | Gong et al. |
| 7,668,665 B2 | 2/2010 | Kim |
| 7,743,066 B2 | 6/2010 | Meijer et al. |
| 7,836,119 B2 | 11/2010 | Lucas et al. |
| 8,429,630 B2 | 4/2013 | Nickolov et al. |
| 8,543,554 B1 | 9/2013 | Singh et al. |
| 8,688,827 B2 | 4/2014 | Gonzalez-Banos et al. |
| 8,689,171 B2 | 4/2014 | Lucas et al. |
| 8,826,255 B1 | 9/2014 | Avadhanula et al. |
| 9,075,818 B2 | 7/2015 | Cavage et al. |
| 9,170,812 B2 | 10/2015 | Vorbach et al. |
| 9,286,187 B2 | 3/2016 | Brucker et al. |
| 9,379,971 B2 | 6/2016 | Sem-Jacobsen et al. |
| 9,628,380 B2 | 4/2017 | Xia et al. |
| 9,918,146 B2 | 3/2018 | Rana et al. |
| 2004/0111255 A1 | 6/2004 | Huerta et al. |
| 2006/0041661 A1 | 2/2006 | Erikson et al. |
| 2006/0212429 A1 | 9/2006 | Bruno et al. |
| 2008/0120594 A1 | 5/2008 | Lucas et al. |
| 2009/0112932 A1 | 4/2009 | Skierkowski et al. |
| 2011/0314382 A1 | 12/2011 | Sweeney |
| 2013/0117272 A1 | 5/2013 | Barga et al. |
| 2013/0261965 A1 | 10/2013 | Delling et al. |
| 2014/0122452 A1 | 5/2014 | Faerber et al. |
| 2014/0372438 A1 | 12/2014 | Chandramouli et al. |
| 2015/0286684 A1 | 10/2015 | Heinz et al. |
| 2015/0347559 A1 | 12/2015 | Elias et al. |

OTHER PUBLICATIONS

Christophides et al.; "From Structured Documents to Novel Query Facilities"; ACM SIGMOD Record; vol. 23 No. 2; 1994; 19 pages.

Bakker et al.; "A Query Language Solution for Shortest Path Problems in Cyclic Geometries"; Proceedings of the IASTED Int'l Conference; Feb. 17-19, 2004; p. 203-207.

Yu et al.; Service selection algorithms for Web services with end-to-end Qos constraints; Dept. of Electrical Engineering and Computer Science; University of California; 2005; p. 103-126.

Lee et al.; "A Psuedo-Distance Routing (PDR) Algorithm for Mobile Ad-hoc Networks"; IEICE Trans. Fundamentals; vol. E89 No. 6; Jun. 2006; p. 1647-1656.

Boulmakoul; "Fuzzy graphs modelling for HazMat telegeomonitoring"; European Journal of Operational Research; vol. 175; 2006; p. 1514-1525.

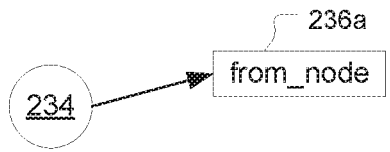
FIG. 2c    FIG. 2d
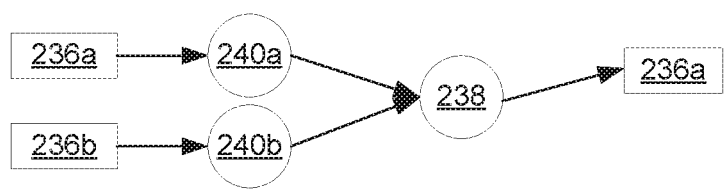
FIG. 2e
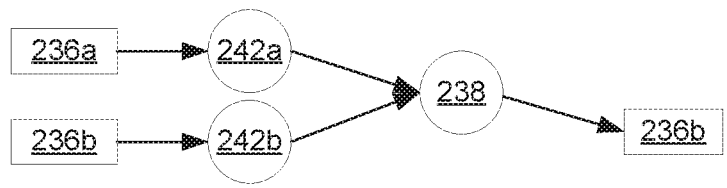
FIG. 2f

FIG. 2n
FIG. 2o

DATABASE EVALUATION OF ANCHORED LENGTH-LIMITED PATH EXPRESSIONS

CROSS-REFERENCE TO RELATED APPLICATION

This Application claims priority to, and is a continuation of U.S. patent application Ser. No. 15/253,591, filed Aug. 31, 2016. U.S. patent application Ser. No. 15/253,591 is incorporated herein by reference in its entirety.

TECHNICAL FIELD

This disclosure relates generally to graph databases and, more specifically, to evaluating regular pathway expressions to discovery pathways in the database.

BACKGROUND

Communication networks have migrated from using specialized networking equipment executing on dedicated hardware, like routers, firewalls, and gateways, to software defined networks (SDNs) executing as virtualized network functions (VNF) in a cloud infrastructure. Network control is directly programmable and the underlying infrastructure is virtualized and abstracted from network services and functions. The ensemble of entities that may comprise a service—VNFs, VNF components (VFCs), virtual machines (VMs), and physical hardware—may dynamically change as the system continues to operate. The complex and dynamic nature of virtualized SDNs makes inventory management a challenging task. An inventory database may facilitate the creation of SDN applications using a modeling language to achieve model-driven networking.

Traditional graph query languages may not be designed to query a layered network inventory for discovering connectivity between nodes. For example, Gremlin or SPARQL may not be designed to return pathways of varying length, such as searches for a pathway of length not greater than 5, because 5 traversal steps return only pathways of length 5 and "zero or more" steps do not restrict the length. Languages that may support pathways of varying length, such as Cypher, do not provide the ability to add constraints that refer to the extracted pathways. For example, such languages provide inadequate solutions for finding pairs of nodes that are connected via routers of some other time (e.g., a certain pathway does not exist between them).

Further, the output of preexisting query languages are such that an additional query cannot be posed on the results of an original query. For example, some common query languages output a graph, while others may output a tuple of values, upon which an additional query cannot be applied. That is, preexisting query languages do not treat pathways as first-class citizens.

In practical network management, typical queries in a network inventory may relate to finding specific nodes, to the connectivity between nodes in some layer, to hosting relationships between nodes on different layers, or to discovery of induced pathways. Current query languages may not allow clear expression of such queries because such queries do not treat pathways as first-class citizens of the language. That is, such query languages are not closed under composition.

There is a need for a technology that facilitates temporal modeling of communication networks, including the types of network elements and the connections therebetween, in such a way that enables querying of that model to enable troubleshooting and creating of SDN applications, including queries for discovering pathways in the network, manipulating pathways, and time-travel queries.

This disclosure is directed to solving one or more of the problems in the existing technology.

SUMMARY

In accordance with an aspect, this disclosure may be directed to a system. The system may include a graph database representative of a network inventory and a processor communicatively coupled to the graph database. The system may also include a user input communicatively coupled to the processor and memory storing instructions. The instructions may cause the processor to effectuate operations. The operations may include receiving, via the user input, a database query comprising a regular pathway expression. The operations may also include parsing the regular pathway expression into fragments. The fragments may include an anchored fragment and at least one other fragment. A number of the fragments may be based on at least a length limitation of the regular pathway expression. The operations may include generating an operator directed acyclic graph (DAG) based on at least the fragments. The operator DAG may include non-operator nodes, operator nodes, and a root. The root may be based on at least the anchored fragment. The operations may also include removing, from the operator DAG, at least one of the non-operator nodes. The operations may also include connecting, within the operator DAG, a first operator node of the operator nodes to a second operator node of the operator nodes. The first operator node may include a first edge into the removed at least one non-operator node, and the second operator node may include a second edge from the removed at least one node. The operations may also include executing the operator DAG on the graph database to return a pathway set comprising at least one pathway that satisfies the regular pathway expression.

In accordance with another aspect, this disclosure may be directed to a method. The method may include parsing a regular pathway expression into at least one fragment. The at least one fragment may include an anchored fragment. A number of the fragments may be based on at least a length limitation of the regular pathway expression. The method also includes generating an operator directed acyclic graph (DAG) based on at least the fragments. The operator DAG may include a non-operator node, an operator node, and a root. The root is based on at least the anchored fragment. The method may also include removing, from the operator DAG, the non-operator node. The method may also include executing the operator DAG on a graph database to return a pathway set comprising at least one pathway that satisfies the regular pathway expression.

According to another aspect, this disclosure may be directed to a method. The method may include parsing a regular pathway expression into fragments. The fragments may include an anchored fragment and at least one other fragment. A number of the fragments may be based on at least a length limitation of the regular pathway expression. The method may include recursively applying one or more transformations to the fragments to generate an operator directed acyclic graph (DAG). The operator DAG may include at least one non-operator node and at least one operator node. The method may also include eliminating an extraneous node of at least one of the at least one non-operator node or the at least one operator node from the operator DAG and executing the operator DAG on a graph database to return a pathway set comprising at least one pathway that satisfies the regular pathway expression.

BRIEF DESCRIPTION OF THE DRAWINGS

Aspects of the herein described systems and methods for evaluating graph database queries are described more fully with reference to the accompanying drawings, which provide examples. In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

FIG. 1b is a layered model that represents a layered graph database based on the exemplary network of FIG. 1a.

FIG. 2c depicts an exemplary transformation of a node expression.

FIG. 2d depicts an exemplary transformation of an edge expression.

FIG. 2e depicts an exemplary transformation of an extension of a pathway by a node.

FIG. 2f depicts an exemplary transformation of an extension of a pathway by an edge.

FIG. 2l depicts an exemplary transformation of a union of multiple nonanchored fragments.

FIGS. 2n-2p depict recursively applying transformations to create an operator DAG.

FIG. 3 is a schematic of an exemplary device that may be a component of the system of FIG. 2a.

DETAILED DESCRIPTION

Figure 1A:
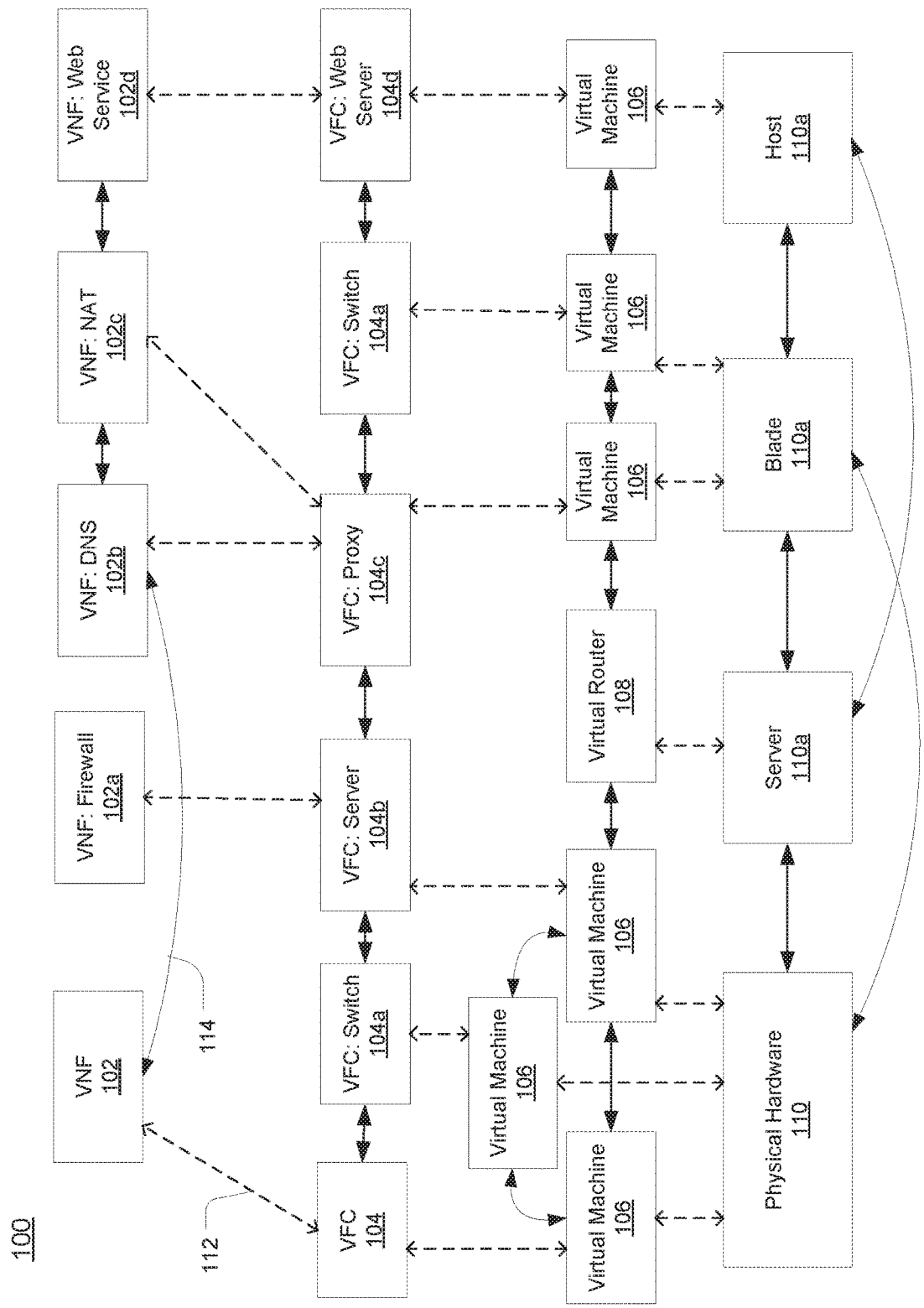
FIG. 1a is a representation of an exemplary network.

FIG. 1a is a representation of an exemplary communication network 100. Generally, communication networks 100 may be large, dynamic, or complicated. To deploy, maintain, and troubleshoot such networks 100, it may be advantageous to understand how network elements—such as servers, switches, virtual machines, and virtual network functions—are connected to one another. It may also be advantageous to discover communication paths between network elements, and how such relationships may change over time.

Network 100 may include network entities, including virtual network functions (VNFs) 102, such as a VNF: firewall 102a, a VNF: DNS 102b, a VNF: NAT 102c, or a VNF: web service 102d; VNF components (VFCs) 104, such as a VFC: switch 104a, a VFC: server 104b, a VFC: proxy 104c, or a VNF: web server 104d; a virtual machine (VM) 106; a virtual router 108; or physical hardware 110, such as a hypervisor host 110a. Relationships between nodes may include hosted-on, communicates-with, or the like. For example, in FIG. 1a, vertical edges (dashed arrows) 112 may represent hosting relationships and horizontal edges (solid arrows) 114 may represent connectivity links.

An inventory of an SDN, like network 100, may store both the network entities as well as their relationships. These relationships may include which VFCs 102 make up VNF 104, which VMs 106 are running which VFCs 102, communication paths between VFCs 102, communication paths between one or more VFCs 102 and VNFs 104, which entities are hosting which other network entities, and the like.

Figure 1B:
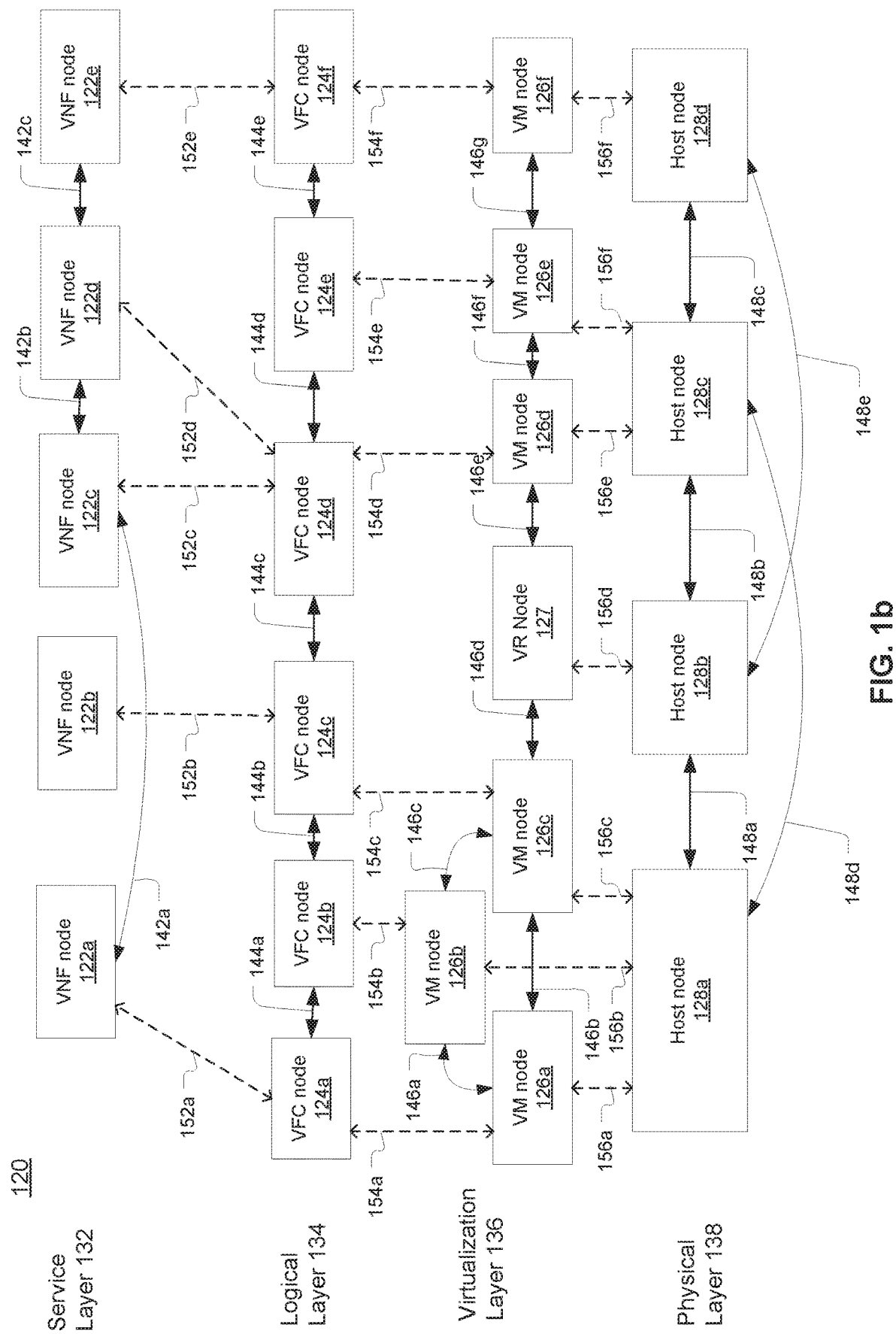

A network inventory or temporal network inventory of communication network 100 may be built. FIG. 1b illustrates an exemplary layered model 120 based on network 100. The network hierarchy model 120 may be built using a schema, and this network hierarchy model 120 may be a layered graph. Further, a query language may be used to query the network inventory, such as based on the schema. In an aspect, the schema and the query language may support Topology and Orchestration Specification for Cloud Applications (TOSCA) abstractions.

The schema may comprise two class types (node classes and edge classes) and two hierarchies (node-class hierarchy and edge-class hierarchy). A node-class hierarchy $H_V$ may be a hierarchy over node classes, and an edge-class hierarchy $H_E$ may be a hierarchy over edge classes. The hierarchies may represent inheritance, as in object-oriented models, and may be used to support a TOSCA model. The hierarchies may be used in integrity constraints, to guarantee that a structure of the data complies with the schema. In an aspect, the schema may facilitate querying networks 100, including large, complicated networks, and may help in cases where the user only has partial information regarding the types of nodes or edges in the network.

A network inventory 120 may represent the components of network 100 and the relationships between them. A network inventory may be defined with respect to a schema, and it may be modeled as a directed graph whose nodes and edges may be instances of the node and edge classes of the schema, respectively. For example, $(C_V, C_E, H_V, H_E)$ may be a schema with a set $C_V$ of node classes, a set $C_E$ of edge classes, a node hierarchy $H_V$, and an edge hierarchy $H_E$. A network inventory over the schema may be a directed graph $G=(V, E)$, where V is a set of nodes and E, a subset of directed edges, is a subset of V×V. In the direct graph, node v may be an element of V and may be an instance of some class $C_V$, which itself may be an element of $C_V$ with respect to $H_V$. Likewise, each edge e may be an element of E and may be an instance of some class $C_e$, which itself may be an element of $C_E$ with respect to $H_E$. Optionally, the schema may contain additional constraints, which may be satisfied by G.

Nodes may be any network entities, whether implemented in software, hardware, or a combination thereof. For example, referring to FIG. 1a, the nodes may include VNFs 102 (including VNF:firewall 102a, VNF: DNS 102b, VNF: NAT 102c, and a VNF: web service 102d), VFCs 104 (including VFC: switch 104a, VFC: server 104b, VFC: proxy 104c, and VNF: web server 104d); VMs 106; VR 108; and physical hardware 110 (including hypervisor host 110).

Each node data structure may belong to one or more node classes. A class may be a pair (N, A) of a class name N and a set of attributes A. Each node data structure may be an instance of a node class. When a node is an instance of a node class, it may have the attributes of the class. A class definition may include constraints on the types of values of its attributes. A class definition may specify default values for its attributes. Node classes may include a VNF node class, a VFC node class, a VM node class, a VR node class, a physical node class, or the like.

The class hierarchy may be a partial order over the class set. In an aspect, a class hierarchy may be denoted by <isa>. Given two classes $C_1=(N_1, A_1)$ and $C_2=(N_2, A_2)$, if $C_1$<isa>$C_2$, $C_2$ may be a superclass of $C_1$, and $C_1$ may be a subclass of $C_2$. For example, if $C_2$ is the virtualization node class, whose attributes are that nodes of the class belong to a virtualization layer 136, and $C_1$ is the virtual machine node class, whose attributes are that the nodes are virtual machines, then the virtualization node class may be a superclass of the virtual machine node class and the virtual machine node class may be a subclass of the virtualization class. In such cases, $A_2$ may be a subset of $A_1$. That is, virtual machine nodes are a subset of nodes that belong to the virtualization layer. A node v may be an instance of a node class $C_V$ if it is an instance of $C_V$ or any subclass of $C_V$.

A node data structure may indicate the node type. For example, this may be indicated based on a node class to which it belongs. Additionally or alternatively, this may indicated by an attribute value of the node data structure. In an aspect, node data types may include a VNF type, a VFC type, a VM type, a physical node type, or the like.

Each node data structure may be associated with a layer of the layered graph. In an aspect, all nodes of the same class or the same node type may be part of the same layer. For example, VNF nodes 122 may be part of a service layer 132, and VFC nodes may be part of a logical layer 134, which may be below service layer 132. VM nodes 126 and VR nodes 127 may be part of virtualization layer 136, and host nodes 128 may be part of a physical layer 138.

The layers may be hierarchical, such that a node of layer i+1 is hosted on some node of layer i. For example, VM node 126 (of virtual layer 136) may be hosted on host node 128a (of physical layer 138). In an aspect, the lowest layer may be physical layer 138, which may comprise hardware, such as hypervisors, servers, or other machines, and the connections between them. The second layer may be virtualization layer 136, which may include VMs 106 or virtual routers 108 and the connections between them. The third layer may be the logical layer 134, which may include VFCs 104 that are deployed on VMs 106, and the connections between them. The fourth layer, service layer 132, may include the VNFs 102 and the connections between them. Different types of hierarchies may be defined in accordance with this disclosure.

Edges may indicate a connection between the respective node and a second node. Edges may indicate that two nodes are in communication with one another. Edges may indicate a physical connection between does. Edges may also indicate one node is deployed on another node, one node hosts another node, or one node is initiated on another node. For example, network 100 includes edges 112 and 114.

Network inventory 120 may include a plurality of edge data structures based on the edges. For example, each edge 142, 144, 146, 148, 152, 154, and 156 may be associated with or based on an edge data structure. Each edge data structure may belong to one or more edge classes. Each edge data structure may be an instance of an edge class. When an edge data structure is an instance of an edge class, it may have the attributes of the class. A class definition may include constraints on the types of values of its attributes. A class definition may specify default values for its attributes.

There may be two types of edges: intra-layer edges and inter-layer edges. Intra-layer edges connect nodes that are on the same layer. Such edges may represent the ability of nodes of the same layer to communicate with one another. For example, edges 142 may represent the ability of certain VNF nodes 122 to communicate with one another. Similarly, edges 144 may represent the ability of certain VFC nodes 124 to communicate with one another, and edges 146 may represent the ability of certain VM nodes 126 and certain VR nodes 127 to communicate with one another. In physical layer 138, edges 148 may represent the ability of certain host nodes 128 to communicate with one another. Additionally, because host nodes 128 may be physical components, edges 148 may represent physical connections.

Inter-layer edges may connect nodes on two different layers. In model 120, inter-layer edges may connect nodes on two adjacent layers, such as edges 152 that connect certain VNF nodes 122 to certain VFC nodes 124, edges 154 that connect certain VFC nodes 124 to certain VM nodes 126, and edges 156 that connect certain VM nodes 126 or certain VR nodes 127 to certain host nodes 128. An inter-layer edge, such as edges 152, 154, or 156, may represent that some node is deployed on or instantiated on some other node of a lower layer. For example, edges 156 may represent that certain VM nodes 126 or VR nodes 127 are deployed on some host nodes 128. Edges 154 may represent that certain VFC nodes 124 are instantiated on certain VM nodes 126.

Each edge data structure may indicate the source node and the target node of the edge. For example, the edge data structure related to edge 152b may identify node 122b and node 124c. For bidirectional connections, the identity of the source node and the target node may be interchangeable. For example, if edge 152b is being ascended, then the source node may be 124c and the target node may be 122b, and if edge 152b is being descended, then the source node may be 122b and the target node may be 124c. Bidirectional connections may include directed edges, where the relationship of the target node to the source node may depend upon a direction in which the edge is being followed. For example, if the target and source nodes of 156a are 126a and 128a, respectively, then edge 156a may indicate that the target node is Hosted_By the source node, and if the target and source nodes of 156a are 128a and 126a, respectively, then edge 156a may indicate that the target node Hosts the source node. In an aspect, an edge may not be bi-directional. For example, an edge may represent that a first node may transmit information to a second node, but that second node may not transmit information to first node along the edge. In such a situation, the target node and the source node of that edge may not be interchangeable.

The inventory may include information on items that are related to network 100 but are not part of network 100 itself, such as suppliers of physical components, customers, and their usage of network functions, or employees who are maintaining network 100. These data nodes may not be part of the hierarchical structure, but may be connected to nodes 122-128, and may be referenced by queries. Optionally, some nodes representing entities of network 100 may not be part of the hierarchy illustrated in FIG. 1b, such as nodes representing subnets. Connections in which at least one of the nodes is not in the network hierarchy 120 are represented by edges that are neither inter-layer nor intra-layer. For example, edges connecting a server and its suppler or a connection between a server and the subnet in which it is maintained are neither inter-layer nor intra-layer.

Network inventory 120 may be stored as a graph database comprising a layered graph based on the plurality of node data structures and the plurality of edge data structures. The graph database may be queried to discovery pathways in network 100. The results of a query of the database may be a set of pathways.

A pathway in a network inventory may be a sequence of alternating nodes and edges, such as $v_1, e_1, v_2, e_2, \ldots, v_{k-1}, e_{k-1}, v_k$, s, such that for each edge $e_i$, node $v_i$ and $v_{i+1}$ may be the source node and the target node, respectively, for all $1 \leq i \leq k-1$. In such pathway, the following node of node $v_1$ may be node and the following edge of $v_i$ is $e_i$. Similarly, $v_{i+1}$ and $e_{i+1}$ may be the following node and following edge of $e_i$. The following is an example pathway in FIG. 1b: $v_{122a}$, $e_{152a}$, $v_{124a}$, $e_{154a}$, $v_{126a}$, $e_{156a}$. For simplicity, such pathways in FIG. 1b can be referred to by the reference number only, as all nodes in FIG. 1b follow the notation style 12Xy, and all edges follow the notation style 15Xy. Thus, the sequence $v_{122a}$, $e_{152a}$, $v_{124a}$, $e_{154a}$, $v_{126a}$, $e_{156a}$ can be rewritten the form 122a, 152a, 124a, 154a, 126a, 156a. Other pathways in FIG. 1b may include the sequence 122b, 152b, 124c, 144c, 124d, 154d; the sequence 122e, 142c, 122d; the sequence 128b, 148a, 128a, 156b, 126b, 146c, 126c; and the sequence 124d. Likewise, pathways in FIG. 1c may be referred to by reference numbers, as all nodes in FIG. 1c follow the notation style 16Xy and all edges follow the notation style 17Xy.

A pathway may have a length L, which may be equal to the number of edges in it. A single node $v_1$ may be a pathway having a length of 0, and a single edge $e_1$, either by itself or with its surrounding nodes $v_1, e_1, v_2$, may be pathway having a length of 1. In an aspect, a single edge $e_i$ may be syntactic sugar for the sequence $v_1, e_1, v_2$. Optionally, it may be advantageous for certain implementations to refer to edges by themselves, without any connecting nodes, as pathways. Referring again to FIG. 1b, the sequence 122a may be a pathway of length 0, as 122a is one node, and the sequence 122a, 152a, 124a may be a pathway of length 1, as 152a is an edge connecting nodes 122a and 124a. Optionally, in implementations where a single edge can make up a pathway, the sequence 152a may be a pathway of length 1.

In querying graph database 202, intra-layer edges (e.g., edges 142, 144, 146, and 148) may be distinguished from inter-layer edges (e.g., edges 152, 154, and 156). For example, to determine how nodes on the same layer are connected, only intra-layer edges should be used in the query. As another example, to determine what functions or virtual machines a certain machine hosts, or to determine on what machine a certain function is instantiated, only intra-layer edges should be used.

In querying network 100, different types of pathways may be used. For example, a descending pathway may be a pathway whose edges are only inter-layer edges from some layer to a lower layer. For example, sequence 122c, 152c, 124d is a descending pathway. As another example, an ascending pathway is a pathway whose edges are only inter-layer edges from one layer to a higher layer. For example, the reverse of the example descending pathway—124d, 152c, 122c—is an example of an ascending pathway, as is the sequence 126d, 154d, 124d, 152d, 122d. Ascending pathways and descending pathways are both vertical pathways. A horizontal pathway is a pathway whose edges are only intra-layer edges. For example, the sequence 124a, 144a, 124b is a horizontal pathway, as is the sequence 128b, 148e, 128d.

Other types of pathways besides vertical pathways and horizontal pathways may be used in a query. For example, the sequence 128a, 156b, 126b, 146c, 126c is neither a vertical nor a horizontal pathway, as it includes both inter-layer edges (e.g., 146c) and intra-layer edges (e.g., 156b).

Figure 1C:
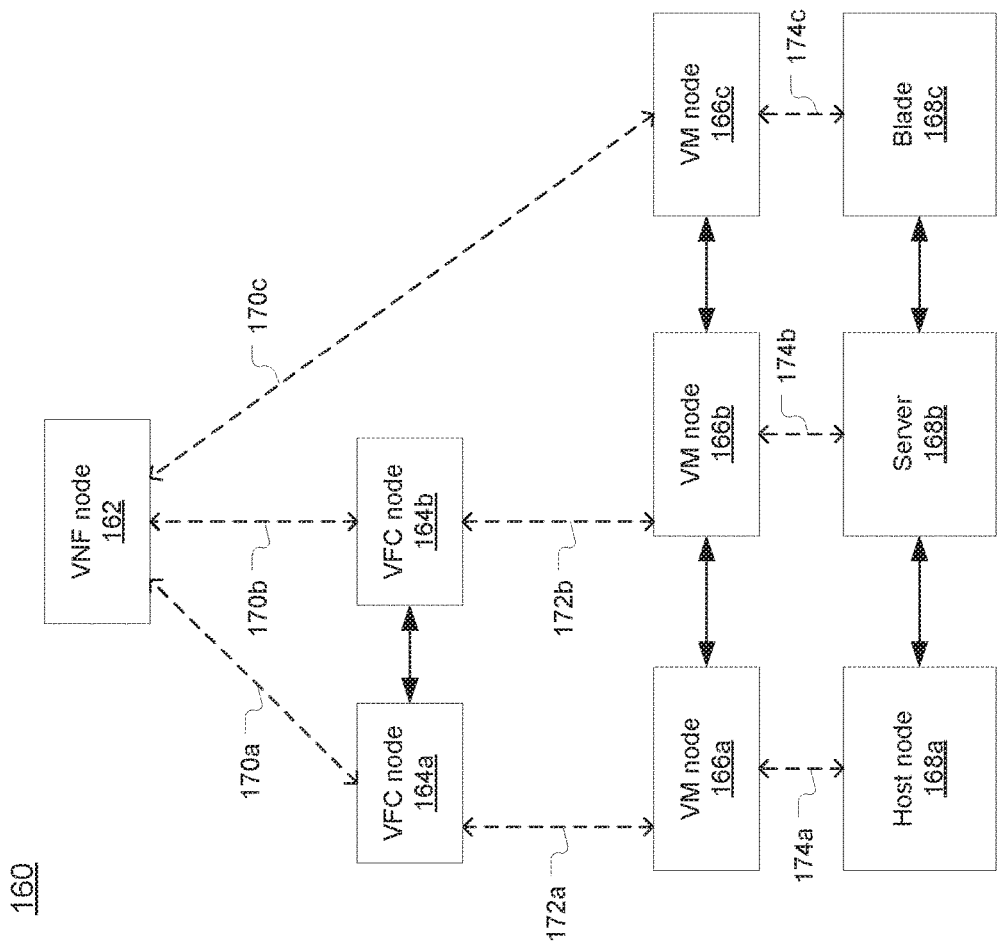
FIG. 1c is a layered model that represents a layered graph database.

FIG. 1c is a representation of a portion of a network inventory 160 that may be stored as a graph database. Like network hierarchy model 120, graph database 160 may be built using a schema. As shown in FIG. 1c, network inventory 160 may include a VNF node 162, VFC nodes 164, VM nodes 166, a host node 168a, a server node 168b, and a blade node 168c. The relationships among nodes may be represented by edges. For example, edges 170 may show that VNF node 162 depends on VFC nodes 164 and VM node 166c. Edges 172 may show that VFC nodes 164 depend on VM nodes 166a and 166b. Edge 174a may show that VM node 166a is hosted on host node 168a, edge 174b may show that VM node 166b is hosted on server 168b, and edge 174c may show that VM node 166c is hosted on blade 168c. In this aspect, edges 170 and 172 may belong to a class or have an attribute characterizing them as "DependsOn" edges, and edges 174 may belong to a class or have an attribute characterizing them as "HostedOn" edges.

Figure 2A:
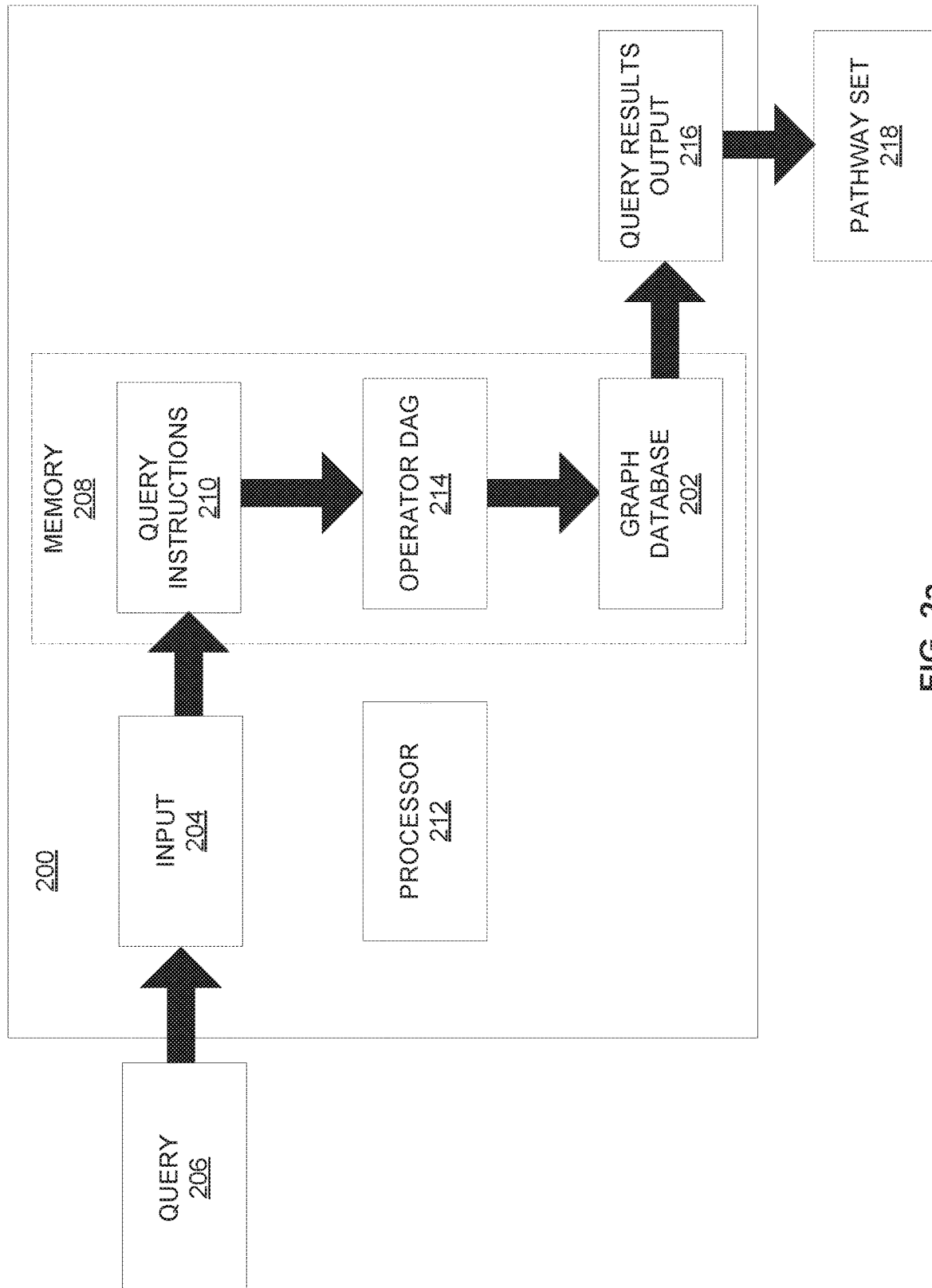
FIG. 2a illustrates a data flow for a system that may be used to create or query a graph database.

FIG. 2a illustrates a data flow that may use system 200 to query a graph database 202. In an aspect, system 200 may include an input through which system 200 may receive a query 206. System 200 may also include memory 208. Memory 208 may store query instructions 210 that may cause a processor 212 of system 200 to effectuate operations. These operations may be based on, use, or otherwise relate to data received at input 204, as well as data stored in or related to graph database 202. For example, these operations may include or result in generating an operator DAG 214. Applying operator DAG 214 to graph database 202 may produce a set of pathways that satisfy query 206, which may be outputted from system 200 by a query results output 216 as a pathway set 218.

Figure 2B:
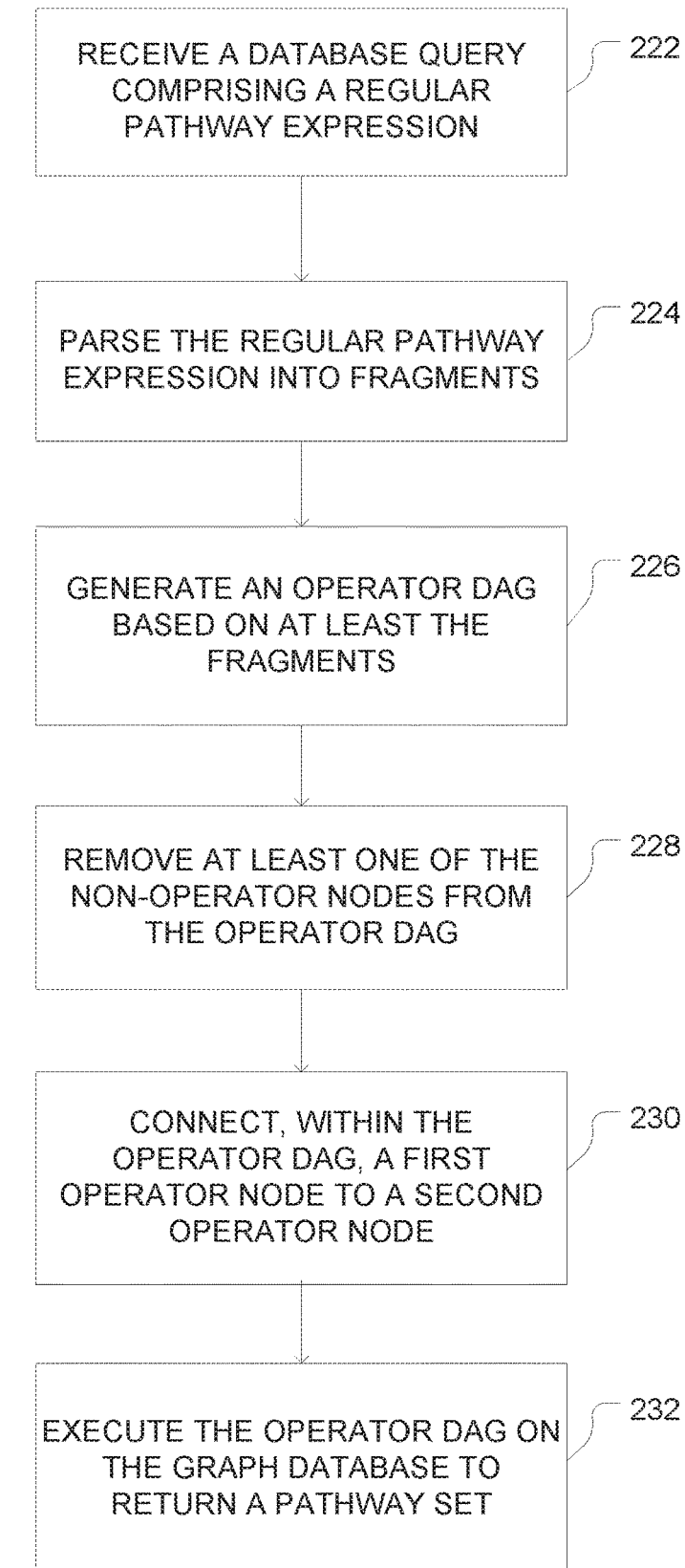
FIG. 2b is a flowchart of an exemplary method for creating a graph database.

FIG. 2b is a flowchart of an exemplary method 220 that may be used by system 200 to evaluate query 206 of graph database 202. At step 222, system 200 may receive a database query 206, such as through input 204. Query 206 may be written in a query language. A query language for querying the graph database represented in FIG. 1b is disclosed. In an aspect, the query language may consider pathways as first-class citizens. The input and the output of query 206 in the query language may each be a set of pathways, so that the query language is closed under composition.

Query 206 may include a regular path expression. In an aspect, a regular pathway expression may comprise edge patterns or node patterns. A node pattern may be denoted by $n(\phi)$, where $\phi$ may be a list of constraints on attributes, and may be satisfied by nodes whose attributes satisfy the constraints. A node pattern with an empty list of constraints—e.g., n( )—may be satisfied by any node. As an example, the following may define a node pattern that is satisfied by active virtual machines with at least 4 GB of memory:

n(class isa 'VM',status='active',memory≥4)

Edge patterns may be denoted by $e(\phi)$, where $\phi$ may be a list of constraints on attributes, and may be satisfied by edges whose attributes satisfy the constraints. An edge pattern with an empty list of constraints—e.g., e( )—may satisfied by any edge. The expression HostedOn(last_modified='2016-03-10 10:10:10') may be satisfied by edges of type Hosted On whose last modification was at the specified time. As an example, the following may define an edge pattern that is satisfied by ascending edges whose status is "valid"; e(class isa 'ASC' and status='valid')

Regular pathway expressions may be defined recursively. A path expression $p_1$ that includes a node expression $n_1$ may be satisfied by paths that include a node that satisfies $n_1$. A path expression $p_1$ that includes an edge expression $e_1$ may be satisfied by paths that include an edge that satisfies $e_1$. Given a path expression $p_1$, the expression $(p_1)$ is satisfied by paths that satisfy $p_1$.

In addition to the node pattern $n(\phi)$ and the edge pattern $e(\phi)$, regular pathway expressions may include other styles. Regular path expressions may include one or more repetitions, concatenations, alternations (also referred to as unions or disjunctions) or parentheses. For example, for a regular pathway expression p, the repetition of p—which may be expressed as $p\{i_1, i_2\}$, where $i_1$ and $i_2$ are integers such that $0 \leq i_1 \leq i_2$—may itself be another regular pathway expression. The repetition expression $p\{i_1, i_2\}$ may be satisfied by a path X if there is $i_1 = < k = < i_2$ such that X satisfies the concatenation $p \rightarrow p \rightarrow \ldots \rightarrow p$ that includes k repetitions of p. When $i_1$ and $i_2$ equal zero, the repetition expression is satisfied by an empty path, and when $i_1$ equals zero and $i_2$ is greater than zero, the expression may be satisfied by paths satisfying $p\{0,0\} | p\{1, n\}$. As another example, for two regular pathway expression $p_1$ and $p_2$, the concatenation of $p_1$ and $p_2$—which may be expressed as $p_1 \rightarrow p_2$ or $(p_1 \| p_2)$—may itself be another regular pathway expression. A concatenation, such as $p_1 \rightarrow p_2$, may be satisfied by a path X if one of the following two cases holds: (1) There is a node n in X such that the path from the source of X to n satisfies $p_1$ and the path from the edge or node that follows n satisfies $p_2$. (2) There is an edge e in X such that the path from the source of X to e satisfies $p_1$ and the path from the edge or node that follows e satisfies $p_2$. (It should be noted that this definition of concatenation may differ from traditional definitions of concatenations, based on constrains being defined on both nodes and edges, rather than just on edges, as is done in conventional systems.) As another example, for two regular pathway expression $p_1$ and $p_2$, the disjunction of $p_1$ and $p_2$—which may be expressed as $(p_1 | p_2)$—may itself be another regular pathway expression. The expression $(p_1 | p_2)$ may be satisfied by paths that either satisfy $p_1$ or satisfy $p_2$. In a regular pathway expression, an expression may appear inside parentheses.

Syntactic sugar may be added to support the following operations. For example, an expression of the form 'p?' may be used to indicate that p may or may not contribute to the result. (An equivalent to 'p?' may be $p\{0,1\}$.) An expression of the form 'p+' may be used to express 'p\{1,m\},' where m is the maximal length of a path, specified as a separate condition. An expression of the form 'p*' may be used to express 'p\{1,m\},' where m is a length limit as in the plus expression, where 'p*' may be equivalent to the expression '(p+)?.'

As part of querying a network, a determination of when a pathway may be satisfied by a given regular pathway expression may be made. As an example, pathway p may be a pathway of the form $v_1, e_1, v_2, e_2, \ldots, v_{k-1}, e_{k-1}, v_k$. Pathway $p_1$ may satisfy $p\{i_1, i_2\}$ if $p_1$ comprises at least $i_1$, and at most $i_2$, consecutive subsequences that satisfy p. For example, n(class isa 'VM') \{3,5\} may be satisfied by pathways that go via 3, 4, or 5 consecutive nodes of class VM (e.g., nodes 126). In an aspect, if $i_1 = 0$—e.g., $p\{0,i_2\}$—then p may be optional. Thus, n(class isa 'VM')\{0,5\} may be satisfied by pathways that go via 1, 2, 3, 4, or 5 consecutive nodes of class VM (e.g., nodes 126) or by pathways that do not contain any nodes of class VM. Similarly, the expression e(class isa 'DependsOn')\{2,3\} may be satisfied by a pathway that goes via 2 or 3 consecutive edges of class 'DependsOn.'

As another example, a given pathway expression may include a concatenation. A determination of whether a pathway satisfies a concatenation may be made in multiple ways. For example, pathway p may satisfy $p_1 \rightarrow p_2$ if there is a node $v_i$ in p such that the subsequence $v_1 \ldots, v_i$ satisfies $p_1$ and either the subsequence $v_{i+1} \ldots v_k$ or the subsequence $e_i, v_{i+1} \ldots v_k$ satisfies $p_2$. Additionally or alternatively, pathway p may satisfy $p_1 \rightarrow p_2$ if there is an edge $e_i$ in p such that the subsequence $v_1 \ldots, v_i, e_i$ satisfies $p_1$ and either the subsequence $v_{i+1} \ldots v_k$ or the subsequence $e_{i+1}, v_{i+1} \ldots v_k$ satisfies $p_2$. In an aspect, following a node pattern or an edge pattern can be an edge pattern or a node pattern. For example, the pathway expression n(class isa 'VM')→e(class isa 'HostedOn')→e(class isa 'DependsOn')→n(class isa 'VR')→n(class isa 'VM') may be satisfied by pathways that start at a VM node (e.g., node 126), go via an edge of class HostedOn, and then onto an edge of class Depends ON, to a node of class VR (e.g., node 127) and then to a node of class VM (e.g., node 126) on any edge of any class.

The syntax of the query language may vary, as long as the syntax provides a mechanism for querying an inventory for a set of pathways. The examples provided herein are for illustration purposes only, and should not be construed as limiting the scope of the disclosed query language or any other feature of this disclosure.

A query may return a set of pathways. In an aspect, a query may identify one or more of the following elements: (1) a first element, which may be one or more pathways (or nodes or edges, which by themselves may be considered pathways) for which to solve, (2) a second element, which may be one or more views of a set of pathways over which one or more pathway variables, such as the first element, may be applied, and (3) a third element, which may include one or more conditions of one or more pathway variables. For example, query 206 received at step 222 of method 220 may comprise pathway variables.

In an aspect, the query language may use a syntax similar to that of SQL. For example, a RETRIEVE clause may identify the first element, a FROM clause may identify the second element, and a WHERE clause may identify the third element.

For example, the following query including pathway variable P:

```
RETRIEVE P
FROM ASC P
WHERE source(P).id =128a AND length(P)=3;
``` which may be expressed in other formats, such as:

```
RETRIEVE P
FROM PATHWAYS P
WHERE P MATCHES
Node(id=123)->[ASC( )]{3} and length(P) = 3;
``` may find the ascending pathways of length 3 from node 128a, which may be the pathways to VFC nodes 124 that are deployed on node 128a. In this query, the first element may be the pathway variable P, the second element may be the set of all ascending pathways as a view of the set of all pathways, and the third element may be that pathway P has a source of node 128a and a length of 3. As another example, the following query:

```
RETRIEVE P
FROM PATHWAYS P
WHERE source(P).id =128a AND length(P)=3;
``` which may be expressed in other formats, such as:

```
RETRIEVE P
FROM PATHWAYS P
WHERE P MATCHES
Node(id=123)->[Edge( )]{3} and length(P) = 3;
``` may find all pathways of length 3 from node 128a, which would include pathways regardless of whether they were ascending, descending, horizontal, or of any other configuration. As another example, the following query:

```
RETRIEVE N
FROM NODES N
WHERE N MATCHES 'VW( )';
``` may find all VM nodes, such as 126a, 126b, 126c, 126d, 126e, and 126f of FIG. 1b. As a node by itself may comprise a pathway, the results of this query may be a set of pathways, where each pathway is of length 0 and may comprise a single node.

Another query may retrieve edges. For example, the following query:

```
RETRIEVE E
FROM EDGES E
WHERE E MATCHES 'e(isa intra-layer)';
``` may find all intra-layer edges, such as edges 152, 154, and 156 of FIG. 1b. As an edge by itself may comprise a pathway, the results of this query may be a set of pathways, where each pathway is of length 1 and may comprise a single edge. Alternatively, this query may return a set of pathways having length 1, where each pathway contains one intra-layer edge and the edge's target node and source node.

The node classes and subclasses and the edge classes and subclasses may be used to define a variable, such as by using the class name. For example, in the above query, e(isa intra-layer) defines the edge as belonging to the intra-layer class and in the preceding query, n(isa VM) defines that node as belonging to the VM class.

A regular form of a query may be when each pathways is associated with a regular pathway expression. In an aspect, query 206 may be written in regular form, or it can be transformed into one. In this manner, query 206 can be input using a syntax (such as a user-friendly syntax, such as SQL) and may be translated into a regular pathway expression. This may be accomplished by rewriting conditions of the query in a regular pathway expression form. For example, the condition length(p)≤k, may be translated into a condition P MATCHES 'no {0,k}' where n( ) is a node pattern that is satisfied by any node. For example, the query:

```
RETRIEVE P
FROM ASC P
WHERE source(P).id = 128a AND length(P) = 2;
``` may be translated into:

```
RETRIEVE P
FROM ASC P
WHERE P MATCHES n(id=128a) -> n( ) -> n( );
```

Also, queries may use views of all horizontal or descending pathways, such as by using the syntax HORIZONTAL and DESC, respectively, as is used by query 206. For example, these views may be included as part of the second element, or, in the exemplary syntax, the FROM clause, which contains pathway variables P, P1, and P2:

```
RETRIEVE P
FROM HORIZONTAL P, DESC P1, DESC P2
WHERE source(P1).id = '124a' AND length(P1) = 2 AND source
(P2).id = '124e' AND length (P2) = 2 AND source (P) = target
(P1) and target (P) = target (P2) AND length P <= 10;
``` may find pathways on the physical layer between the hosts of two VNF nodes 124a and 124e. The view HORIZONTAL P may limit P to horizontal pathways, and the views DESC P1, and DESC P2 may limit P1 and P2 to descending pathways. This query may be solved by finding pathway P1 from 124a and pathway P2 from 124e to physical layer 138, which may indicate on which host node 128 each VNF node 124a and 124e is deployed (e.g., node 128a and node 128c, respectively) and then finding horizontal pathways p between the two discovered hosts.

This query uses a join to connect the three pathway variables, P, P1, and P2, by comparing the target of one pathway to the source of another pathway. The above query may be rewritten in regular form, such as:

```
RETRIEVE P
FROM HORIZONTAL P, DESC P1, DESC P2
WHERE P1 MATCHES 'n(id = 124a) -> n( ) -> n( )' AND P2
MATCHES 'n(id = 124e) -> n( ) -> n( )' AND source(P) = target(P1)
AND target(P) = target (P2) AND P MATCHES 'n( ){0, 10}';
```

A query having multiple variables may be written using subqueries. In an aspect, the syntax for subqueries may follow the same structure as the syntax for queries. For example, the preceding query may be written as:

```
RETRIEVE P
FROM HORIZONTAL P WHERE source(P) = target(
    RETRIEVE P1
    FROM DESC P1
    WHERE P1 MATCHES 'n(id = 124a) -> n( ) -> n( )') AND
target(P) = target(
    RETRIEVE P2
    FROM DESC P2
    WHERE P2 MATCHES 'n(id = 124e) -> n( ) -> n( )') AND
P MATCHES 'n( ){0, 10}');
```

A query may also use Boolean functions. For example, an EXISTS clause in a query may return 'TRUE' (or 1) if that clause is true, and a NOT EXISTS clause (e.g., a negation clause) may return 'TRUE' (or 1) if that clause is false. In an aspect, negation may be expressed by using NOT EXISTS. For example, the following query:

```
RETRIEVE N
FROM NODES N
WHERE N MATCHES 'n(isa VM)' AND NOT EXISTS (
    RETRIEVE P
    FROM ASC P
    WHERE source(P) = N AND length(P) <= 2);
``` may find VM nodes 126 that do not host any VFC nodes 124 or VNF nodes 122 (as there are no ascending pathways from the returned VM nodes). This syntax assumes that ASC P only refers to pathways with lengths greater than or equal to 1, so that pathways of length zero—which, by definition, any node N may qualify—would not cause the NOT EXISTS query to return false. If the syntax uses ASC P such that it includes pathways of length 0, the same query could be expressed by adding "AND length(P)>0" to the WHERE clause of the RETRIEVE P subquery, such as:

```
RETRIEVE N
FROM NODES N
WHERE N MATCHES 'n(isa VM)' AND NOT EXISTS (
    RETRIEVE P
    FROM ASC P
    WHERE source(P) = N AND length(P) <= 2 AND length(P) > 0);
```

As an example, query 206 may be received at input 204 as:

```
RETRIEVE P
FROM DESC P, NODES N
WHERE source(P).id=162 AND length(P)<=3 AND length(P)>=2
AND target(P) = N AND (N MATCHES 'n(isa host)' OR 'n(isa
server)' OR 'n(isa blade)');.
```

Thus, query 206 may comprise the regular pathway expression:

VNF(id='162')→(HostedOn( )|DependsOn( ){2,3}→
(Host( )|Server( )|Blade( ))

An anchor set may be determined based on pathway variables of query 206. An anchor set may be a set of nodes that may be used as an initial node set in the identification of pathways. The size of an anchor set may vary. For example, the anchor set size may be based on the size of the network or the size of the query. In an aspect, using a larger anchor set for a larger network may provide more accurate or more reliable query results. Optionally, the anchor set size may be based on the available computation resources. In an aspect, a larger anchor set may require more computation resources, so queries performed when resources are in high demand, or queries performed where the speed of determining the query results is of greater importance, may use smaller anchor sets. Given an anchor set A and a length limit L, an anchored length-limited set of pathways ("ALLP") may be a set of pathways such that all pathways in the set go via a node in A and their length does not exceed L.

For example, consider the following query:

```
RETRIEVE P
FROM HORIZONTAL P, DESC P1, DESC P2
WHERE P1 MATCHES 'n(id = 124a) -> n( ) -> n( )' AND P2
MATCHES 'n(id = 124e) -> n( ) -> n( )' AND source(P) = target(P1)
AND target(P) = target (P2) AND P MATCHES 'n( ){0, 10}';
```

The pathway variables of query may include P, P1, and P2. The anchor set for each pathway variable of query may be determined. An anchor set may be directly defined, such as for variable P1, which has a condition that its source node be node 124a, and variable P2, which has a condition that its source node be node 124e. Thus, the anchor set for P1 may be node 124a, and the anchor set for P2 may be node 124e.

An anchor may be a starting point for computing the regular path expressions. An anchor may be defined by some expression that is satisfied by a small set of nodes (or edges), and the anchor may provide the initial set of nodes or paths, that may be extended iteratively to provide the result paths.

A node expression or an edge expression that specifies a small set of nodes (or edges) may be a potential anchor. For example, the expressions DNS(id=12345) or HostedOn (last_modified='2016-03-15 10:10:10') may each serve as an anchor, assuming the first one defines a set consisting of a single DNS, and the second one yields a small set of Hosted(On edges. The estimation whether the node specifies a small set may be done in various ways, such as by sampling.

Given a concatenation of regular path expressions (e.g., $p_1 \rightarrow p_2 \rightarrow p_3 \rightarrow \ldots p_k$), any node or edge expression $p_i$ that may specify a small set of nodes or edges may be a potential anchor of this expression. If there are several potential expressions, an anchor whose set may be expected to be the smallest may be used as the anchor.

If no anchor is discovered, an anchor or anchor set from the complex expressions $p_1, \ldots, p_k$ may be selected. For example, given an alternation $p_1 \, p_2$, if there is a potential anchor for $p_1$ and a potential anchor for $p_2$, those anchors may be extracted and used to compute the paths matching the expressions $p_1$ and $p_2$. The union of those path sets may be used as an anchor for further computation, such as when $p_1|p_2$, is concatenated with other expressions. As another example, the repetition expression $p_1 \, \{m, n\}$, where m>0, may be rewritten as $p_1 \rightarrow p_1\{m-1, n-1\}$, and if $p_1$ is a potential anchor, or if a potential anchor can be extracted from $p_1$, such can be the anchor of the entire expression.

However, in the case of a concatenation of repetitions p of the form $p_1\{0,n_1\} \rightarrow p_2\{0, n_2\} \rightarrow \ldots p_k\{0, n_k\}$, extracting an anchor may not be performed using the previous strategy. However, every non-empty path that satisfies this expression must satisfy at least one of the repetitions. That is, is pathway X satisfies p, then a part of X must satisfy at least one of the subexpressions $p_i$. Thus, p may be rewritten to provide the following set of path expressions:

$$r_1 = p_1\{1,n_1\} \rightarrow p_2\{0,n_2\} \rightarrow \ldots p_k\{0,n_k\}$$

$$r_2 = p_2\{1,n_1\} \rightarrow \ldots p_k\{0,n_k\}$$

$$r_k = p_k\{1,n_k\}$$

Such that the expression p is equivalent to $r_1|r_2| \ldots r_k$, and each $r_i$ has subexpression of the form $p_i\{1, n_i\}$, from which an anchor may be extracted. In an aspect, there may be no repetitions embedded in subexpressions $p_i$, such that the anchor extraction procedure may not need to be applied recursively.

Step 224 may include parsing the regular pathway expression into fragments. This may be done using methods for constructing parse trees from textual representations. In an aspect, the parse tree of a regular pathway expression may be flattened to gather operations together in the same node. For example, the regular pathway expression of query 206:

VNF(id='162')→(HostedOn( )|DependsOn( )){2,3}→
(Host( )|Server( )|Blade( ))

may be represented by:

Concatenate(VNF,Repeat(HostedOn,2,3),Alternate
(Host,Server,Blade))

The parse tree fragment Concatenate (A, Concatenate (B, C)) may be transformed into Concatenate (A, B, C).

The fragments of the regular pathway expression may include at least one anchored fragment. The fragments may also include other fragments, including nonanchored fragments. An anchored fragment may be a fragment that contains one or more of the anchors of the regular pathway expression.

Returning to the example of query 206, the regular pathway expression

VNF(id='162')→(HostedOn( )|DependsOn( )){2,3}→
(Host( )|Server( )|Blade( ))

may be parsed into three fragments:

VNF(id='162')     (1)

(HostedOn( )|DependsOn( )){2,3}     (2)

(Host( )|Server( )|Blade( ))     (3)

such that the regular pathway expression may be represented by (1)→(2)→(3)

In the above example, the fragment (1) may be an anchored fragment, and fragments (2) and (3) may be nonanchored fragments.

Step 226 may include generating operator DAG 214 based on at least the fragments. Operator DAG 214 may include one or more operator nodes representing operators that may be used to compute a pathway set 218 matching a regular path expression. An operator may take in zero or more sets (or multisets) of records and may produce one or more sets (or multisets) of records. An operator may provide its output to multiple recipients.

Operators may be linked into operator DAG 214, with the edges of operator DAG 214 indicating data flow, and operator nodes indicating the operators. Operator DAG 214 may include one or more roots, which may be operators with zero inputs. A DAG root may access data, and other operators within operator DAG 214 may process data.

Operator DAG 214 may indicate the processing to be performed as well as the order in which such processing is to be performed. In an aspect, operators may be executed in topological order: an operator may be executed when it has received all of its inputs. Some operators may be blocking, such that they may execute only when all of their inputs are available, and may then produce their entire output. Other operators may be pipelined, such that they may start executing on partial inputs to produce partial outputs. Edges between operators may indicate the data transfer mechanisms and may support blocking and pipelined results.

Generating operator DAG 214 may include recursively applying one or more transformations until all regular pathway expressions are rendered into operators. The transformation of a fragment may create a sub-DAG. The transformations may include one or more selections, extensions, concatenations, unions, and repetitions. Each type of transformation is addressed in turn.

A selection node 234 may execute a query on the underlying data store to extract a set of nodes (e.g., nodes 122, 124, 126, or 128 in FIG. 1b or nodes 162, 164, 166, or 168 in FIG. 1c) or edges (e.g., edges 142, 144, 146, 148, 152, 154, or 156 in FIG. 1b or edges 170, 172, or 174 in FIG. 1c) from graph database 202 that correspond to an anchor. Selection node 234 may take zero inputs and may produce one output. Selection node 234 may be parameterized by the node or edge expression of the anchor.

FIG. 2c illustrates a transformation for a node expression. Transformation of a node expression may use selection node 234 connected to a from_node 236a. From_node 236a, a type of non-operator node of an operator DAG (or sub-DAG), may be used to connect operator nodes together when the input to from_node 236a is data ending in a node. FIG. 2d illustrates a transformation for an edge expression. Transformation of an edge expression may use selection node 234 connected to a from_edge 236b. From_edge 236b, a type of non-operator node of an operator DAG (or sub-DAG), may be used to connect operator nodes together when the input to from_edge 236b is data ending in an edge.

A union operator 238 may collect sets of paths from predecessor operators and combine them into a single output. Union operator 238 may be used to accommodate nondeterminism in the regular pathway expression (e.g., combining the results of a disjunction) or to combine the results of a repetition expression.

An extend operator 240 may add a node or an edge to a pathway. This may implement concatenation by a single node or edge expression. Extend operator 240 may receive one input and produce one output. Since an anchor may occur in the middle of a concatenated pathway, extend operator 240 may be able to extend forwards (in the same direction as the edge in the regular path expression) or backwards (in the opposite direction than the edge in the regular path expression). In an aspect, extend operator 240 may include two sub-classes: extend forwards and extend backwards.

In graph database 202, extending a pathway that ends in a node (such as node 164a) may be described as adding another node (such as node 166a) to the pathway. This may include extending the pathway to include the interconnecting edge, such that applying extend operator 240 to pathway 164a may result in a pathway set that includes pathway 164a, 172a, 166a. Likewise, extending a pathway that ends in an edge (such as edge 172a) may be described as adding another edge (such as edge 174a) to the pathway. This may include extending the pathway to include the interconnected node, such that applying extend operator 240 to pathway 172a may result in a pathway set that includes pathway 172a, 166a, 174a. Thus, there may be different implementations of extensions, depending, for example, on whether the input path ends in an edge or a node, whether the extension adds a node or an edge, whether the extension is backwards or forwards, and whether the extension is simple (e.g., does not repeat any nodes) or nonsimple (e.g., allows the repeat of nodes). Thus, extend operator 240 may include multiple subclasses. For example, sixteen subclasses may be used to account for every combination of extending from a node or edge, extending by a node or edge, backwards or forwards extension, and simple or nonsimple extension. As another example, extend operator 240 may include four classes: (1) extend operator 240a, which may extend a pathway ending in a node by a node, (2) extend operator 240b, which may extend a pathway ending in an edge by a node, (3) extend operator 242a, which may extend a pathway ending in a node by an edge, and (4) extend operator 242b, which may extend a pathway ending in an edge by an edge.

FIG. 2e illustrates a transformation that involves an extension of a pathway by a node. The input to the extension may end in a node or an edge; thus, inputs to the extension transformation are received from from_node 236a and from_node 236b. In this example, there are two types of extend operators that add a node: extend operator 240a that receives an input ending in a node and extend operator 240b that receives an input ending in an edge. These two possibilities are then combined with union operator 238. Then union operator 238 may be connected to other operators through from_node 236a.

FIG. 2f illustrates a transformation that involves an extension of a pathway by an edge. The input to the extension may end in a node or an edge; thus, inputs to the extension transformation are received from from_node 236a and from_node 236b. In this example, there are two types of extend operators that add an edge: extend operator 242a that receives an input ending in a node and extend operator 242b that receives an input ending in an edge. These two possibilities are then combined with union operator 238. Then union operator 238 may be connected to other operators through from_edge 236b.

Figure 2G:
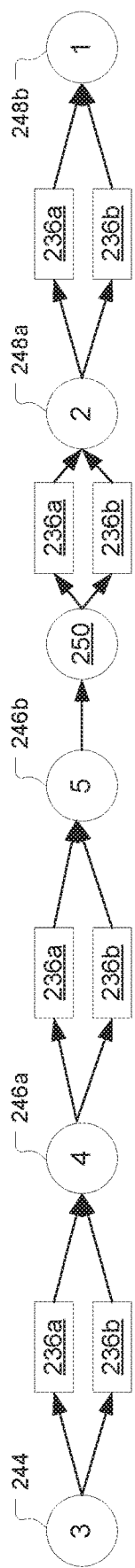
FIG. 2g depicts an exemplary transformation of a concatenation of multiple fragments including an anchored fragment.
Figure 2H:
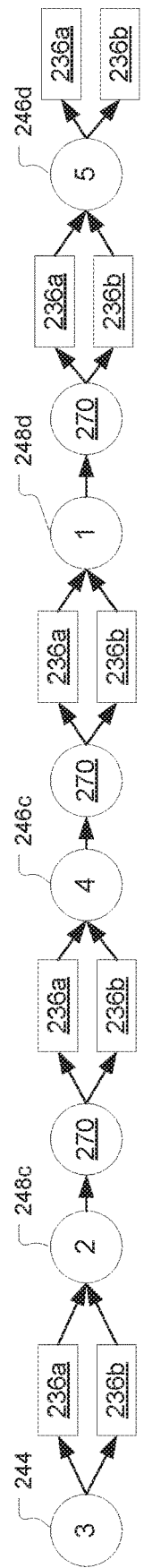
FIG. 2h depicts an exemplary transformation of a concatenation of multiple fragments including an anchored fragment.

A transformation may include a concatenation of two or more fragments, including an anchored fragment, as shown in FIGS. 2g and 2h, which illustrate exemplary DAGs. In this example, the expression may be (1)→(2)→(3)→(4)→(5), where fragment (3) is the anchored fragment. In transforming the concatenation, anchored fragment node 244 may be placed at the root, as shown in FIGS. 2g and 2h. The operator DAG may then be extended with placeholder nodes representing the other fragments. An extension may be made if the extending fragment is the neighbor of a fragment that has already been added to the DAG. Thus, after anchored fragment node 244, a placeholder node for fragment (2) or fragment (4)—the neighbors of anchored fragment (3)—may be added. Similarly, a placeholder node for fragment (5) may be added after a placeholder node for fragment (4) is added, and a placeholder node for fragment (1) may be added after a placeholder node for fragment (2) is added.

Thus, for the example expression (1)→(2)→(3)→(4)→(5), the order of the placeholder may be: (A) 3, 4, 5, 2, 1; (B) 3, 2, 4, 1, 5; (C) 3, 2, 1, 4, 5; (D) 3, 4, 2, 5, 1; (E) 3, 2, 4, 5, 1; or (F) 3, 4, 2, 1, 5.

If the fragment occurs before anchored fragment node 244, its placeholder node is marked as a forwards fragment node 246; otherwise, its placeholder is marked as a backwards fragment node 248. Fragment placeholder nodes may be connected to one another by one or more non-operator nodes. In certain circumstances, it may be difficult or impossible to predict whether the input to operator DAG 214 or one of its sub-DAGs representing a fragment ends with a node or an edge. Thus, non-operator nodes from_node 236a and from_edge 236b may be used to account for both situations: a fragment ending in a node and a fragment ending in an edge, respectively.

Whenever the extension switches direction—from forwards to backwards (e.g. forwards placeholder nodes 246 to backwards placeholder nodes 248) or from backwards to forwards (e.g. backwards placeholder nodes 248 to forwards placeholder nodes 246)—a repartition operator 250 may be inserted. For example, repartition operator 250 may convert pathways from partitioned on the entity type at the beginning of the pathway to partitioned on the entity type at the end of the pathway, or to convert pathways from partitioned on the entity type at the end of the pathway to partitioned on the entity type at the beginning of the pathway.

Like extend operators 240, placeholder nodes may be sub-classed based on whether they are extending forwards or backwards (e.g., forwards placeholder nodes 246 and backwards placeholder nodes 248). The output of a forwards operator (e.g., forwards extend operator or forwards placeholder node 246) may be properly partitioned for a subsequent forwards operator. However, if a subsequent operator is a backwards operator (e.g., backwards extend operator or backwards placeholder node 248), the output may not be properly partitioned on the entity at the beginning of the path. Repartition operator 250 may perform this partitioning. Repartition operator 250 may be subclasssed by whether the repartitioning is done on the entity at the beginning of the path versus the entity at the end of the path.

Returning to transformation of the anchored concatenation (1)→(2)→(3)→(4)→(5),

FIG. 2g illustrates a transformation using order option A: 3, 4, 5, 2, 1. Repartition operator 250 may be inserted between forwards fragment node 264b and backwards fragment node 266a.

FIG. 2h illustrates a transformation of the anchored concatenation (1)→(2)→(3)→(4)→(5)

using order option B: 3, 2, 4, 1, 5. Repartition operator 250 may be inserted between backwards fragment node 248c and forwards fragment node 246c, between forwards fragment node 246c and backwards fragment node 248d, and between backwards fragment node 248d and forwards fragment node 246d.

Figure 2I:
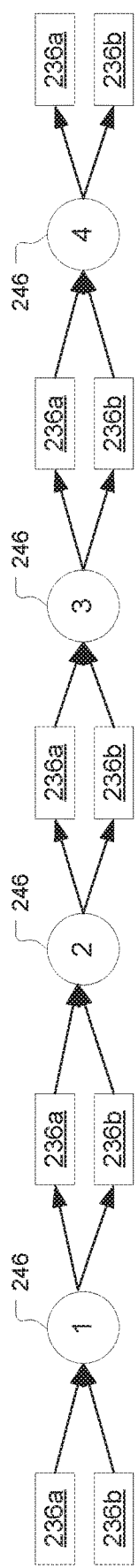
FIG. 2i depicts an exemplary transformation of a concatenation of multiple nonanchored fragments.
Figure 2J:
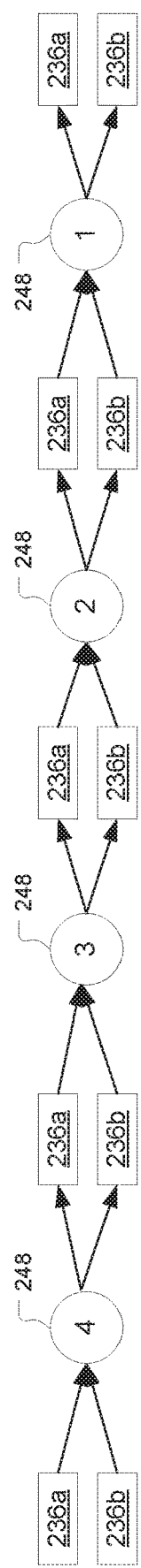
FIG. 2j depicts an exemplary transformation of a concatenation of multiple nonanchored fragments
Figure 2I:
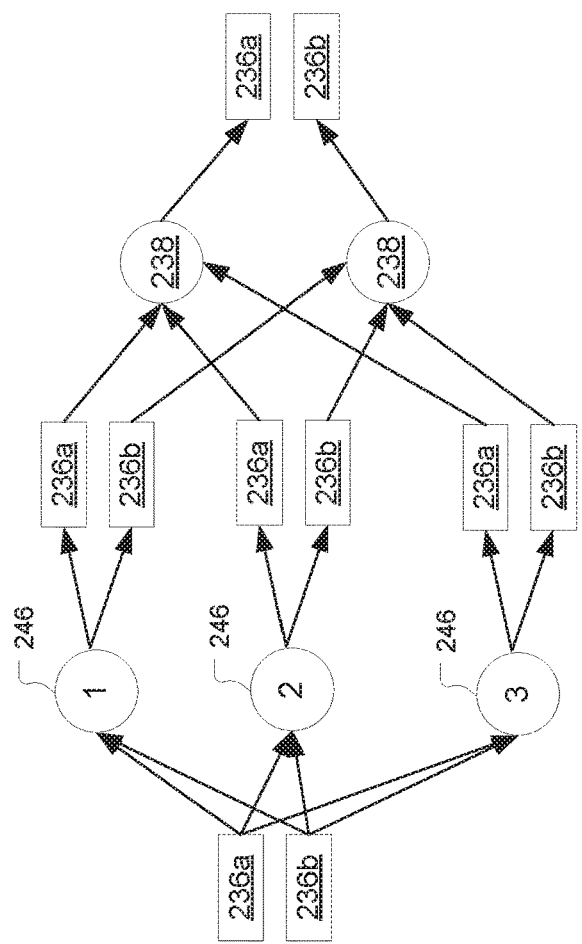

The transformations may include concatenation of two or more nonanchored fragments, as shown in FIGS. 2i and 2j, which illustrate exemplary DAGs based on the transformation of the regular expression (1)→(2)→(3)→(4)

Nonanchored concatenation transformation, like that in FIGS. 2i and 2j, may be similar to an anchored concatenation transformation, such as those illustrated by FIGS. 2g and 2h. Since the leftmost placeholder is not a root (in contrast to the anchored concatenation transformation in FIGS. 2g and 2h), the leftmost placeholder may extend the DAG from a previous operator, making use of from_node 236a and from_edge 236b. Based on the ordering of the placeholders, FIG. 2i uses forwards placeholder nodes 246, and FIG. 2j uses backwards placeholders 248.

Figure 2K:
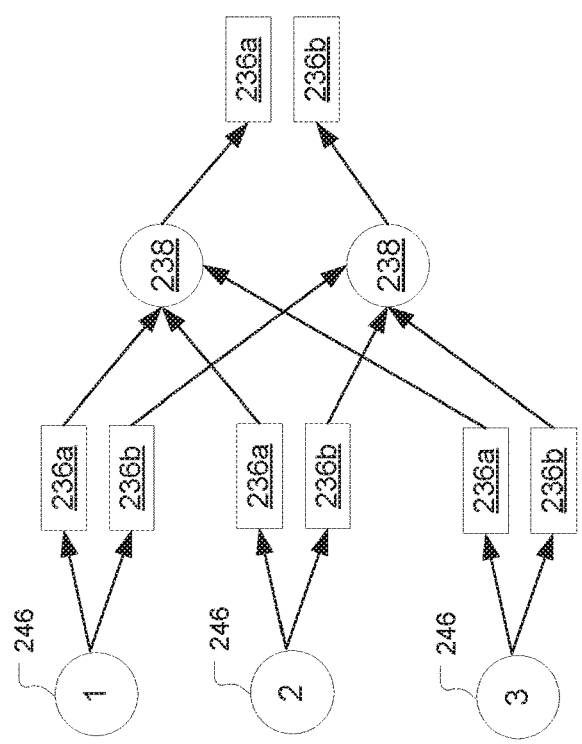
FIG. 2k depicts an exemplary transformation of a union of multiple anchored fragments.

Transformations may include unions, as illustrated in FIGS. 2k and 2l, which illustrate the transformation of the regular expression (1)|(2)|(3). Unions may include unions of multiple fragments. The union may include anchored fragments, as shown in FIG. 2k. Additionally or alternatively, the union may include unanchored fragments, as shown in FIG. 2l. The transformation of unions may include union operator 238 that outputs a single output. Transformation of unions may segregate paths ending in a node from those ending in an edge, as illustrated in FIGS. 2k and 2l. The difference between union of anchored fragments and a union of nonanchored fragments is whether the leftmost placeholders are roots, or whether the leftmost placeholders receive inputs through a from_node 236a or from_edge 236b.

Figure 2M:
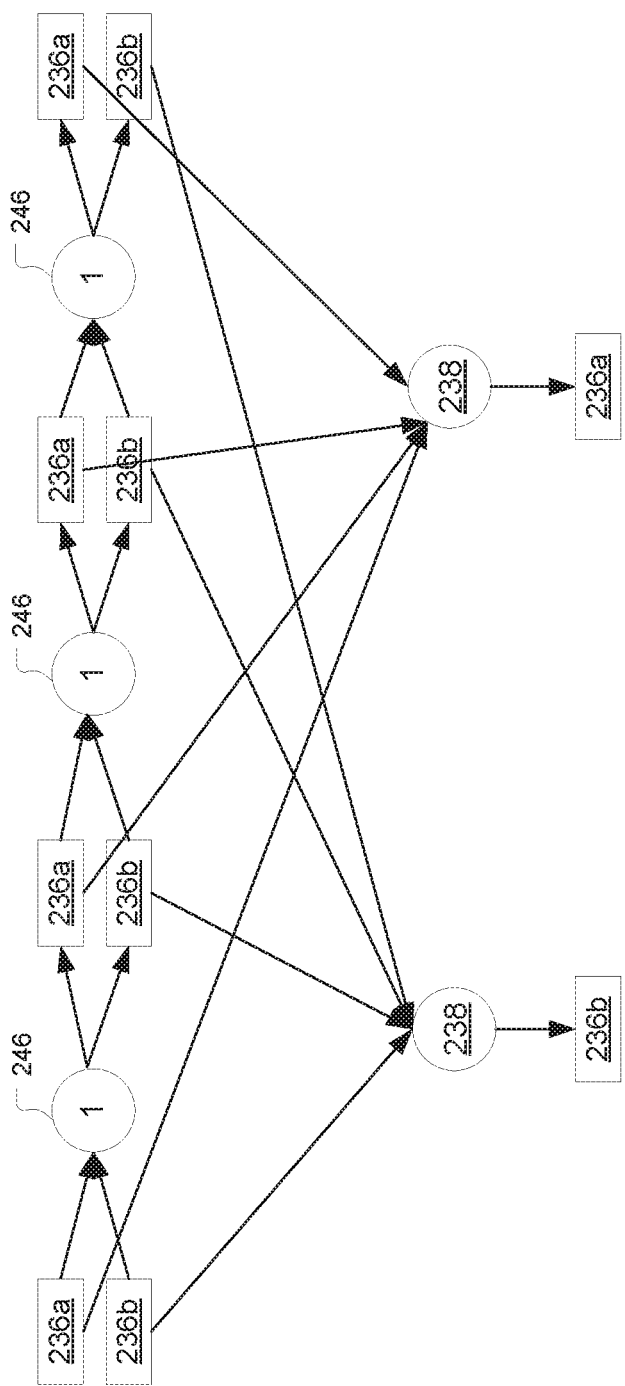
FIG. 2m depicts an exemplary transformation of a repetition.

FIG. 2m illustrates a transformation of a repetition. The regular pathway expression may be (1){0,3}

In an aspect, fragment (1) may be a nonanchored expression. Results for repetitions 0, 1, 2, and 3 may be unioned, segregated by whether the outputs end in a node or edge. The placeholders for (1) may be forwards node placeholders 246 or backwards node placeholders 248, depending upon the forwards/backwards quality of the parent.

Returning to exemplary query 206, step 226 may include generating operator DAG 214. FIGS. 2n through 2s illustrate a process of generating an operator DAG based on query 206. These figures illustrate recursively applying one or more transformations to the fragments to generate operator DAG 214. which recites, VNF(id='162')→(HostedOn( )|DependsOn( ){2,3}→
(Host( )|Server( )|Blade( )

and which at step 224 was parsed into three fragments:

VNF(id='162')  (1)

(HostedOn( )|DependsOn( ){2,3}  (2)

(Host( )|Server( )|Blade( )  (3)

Thus, query 206 may be represented by the concatenation of fragments (1), (2), and (3):

(1)→(2)→(3)

FIG. 2n illustrates the transformation of this concatenation using forwards placeholder nodes 246 for each fragment: forwards placeholder nodes 246m, 246n, and 246o, respectively.

In FIG. 2o, forwards placeholder node 246m may be replaced by the selection operator node 234.

Figure 2P:
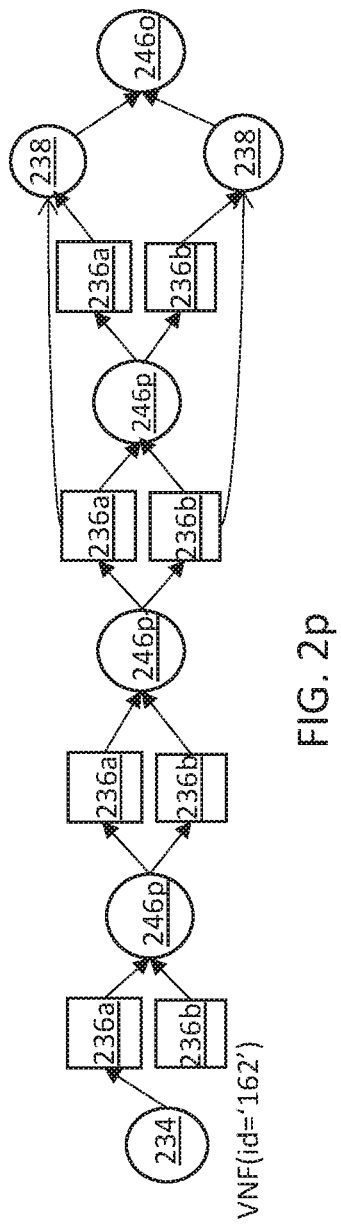

In FIG. 2p, forwards placeholder node 246n may be replaced by a DAG for a repetition. The repeated block—(HostedOn( )|DependsOn( )—within the representation may be represented by forwards placeholder node 246p.

Method 200 may include pruning operator DAG 214 to eliminate extraneous nodes. For example, at step 228, method 200 may include removing at least one of the non-operator nodes (e.g., from_node 236a, from_edge 236b). Nodes 236a and 236b may be used to aid in the recursive linkage of generated sub-DAGs. Once operator DAG 214 is fully expanded, these non-operator nodes may be removed. Then, at step 230, operators that have an edge into deleted node may be connected to any operators that have an edge from the deleted node.

Method 200 may also include other pruning or cleanup. For example, this may include removing one or more operators for which there is no path connecting that operator to a selection node 234, as such operators may never receive input. As another example, union nodes 238 that only receive one input may be extraneous. Such union nodes 238 may be removed, and its input node be connected to its output node.

Further, generating or pruning operator DAG 214 may include using extended operator nodes. A multiselect operator may be used if there are two or more node or edge expressions among the subexpressions. For example, a node (e.g., node 246 or node 248) may be used to represent a multiselect operator. A multiselect operator may be used to represent an alternation among individual node or edge expressions. That is, an RPE fragment Union(Select('Host(id=$XYZ$)'),Select('Server
(id=$ABC$)'))

may be represented or expressed as

MultiSelect('Host(id=$XYZ$)','Server(id=$ABC$)').

A relaxedExtend operator may be used to dispense with from node and from_edge nodes 236a and 236b. As discussed above, extend operators may have multiple subclasses. A relaxedExtend operator may include sufficient internal logic to be able to perform an extension on a heterogeneous set of pathways that may end with either a node or an edge. A relaxedExtend operator may be used to remove many union nodes 238 from operator DAG 214, and may permit larger scale operations.

A multi Extend operator may be used. In many cases, an anchor may be identified as an alternation among individual node or edge expressions. For example, in the regular pathway expression VNF(id_='123435')→(HostedOn( )|Depends
On( ){2,3}→(Host( )|Server( )

the alternation Host( ) Server( ) may be a choice between two node extensions. If the input path set is P, then using an extend node 240, this RPE fragment may be expressed as Union(Extend(P,"Host( )","Server( )")

Using a multiExtend, this expression may be represented as

MultiExtend(P,"Host( )","Server( )")

Such simplification of operators may allow the input path set P to be transmitted to an underlying data store once, rather than twice, as would be done if the same analysis was performed using the union operator and an extend operator. Thus, the use of a multiExtend operator may increase the efficiency of evaluating query 206.

As another example, a blockExtend operator may be used to express a repetition block. The contents of a repetition block may contain node and edge expressions, concatenations, or alternations. Optionally, certain operators, such as other repetitions, may be prohibited from being part of a repetition block.

Regular pathway expression fragment (HostedOn( )|DependsOn( ){2,3} may be expressed using basic operators on input pathway set P as:

$Q1$=Union(Extend(P,"HostedOn( )",Extend(P,"De-
pendsOn( )"))

$Q2 = \text{Union}(\text{Extend}(Q1, \text{"HostedOn( )"}, \text{Extend}(Q1, \text{"DependsOn( )"}))$ $Q3 = \text{Union}(\text{Extend}(Q2, \text{"HostedOn( )"}, \text{Extend}(Q2, \text{"DependsOn( )"}))$ $Q = \text{Union}(Q2, Q3)$ An expression of this fragment using a blockExtend operator may be:

BlockExtend(P,[["HostedOn( )","DependsOn( )"]],2, 3)

In this syntax, a second parameter may be a list expression the concatenation of MultiExtend-equivalent operations. This block may be repeated 2 to 3 times. A BlockExtend may also be a shortcut for a concatenated sequence of Extend or MultiExtend operations.

These advanced operators, like the basic operators, may be subclassed based on certain parameters, such as whether they are forwards or backwards, receive an input ending in a node or an edge, produce an output ending in a node or an edge, or are simple or nonsimple.

At step 232, operator DAG 214 may be executed on graph database 202. Executing operator DAG 214 may return a pathway set. The pathway set may comprise a pathway that satisfies the regular pathway expression of query 206.

Figure 3:
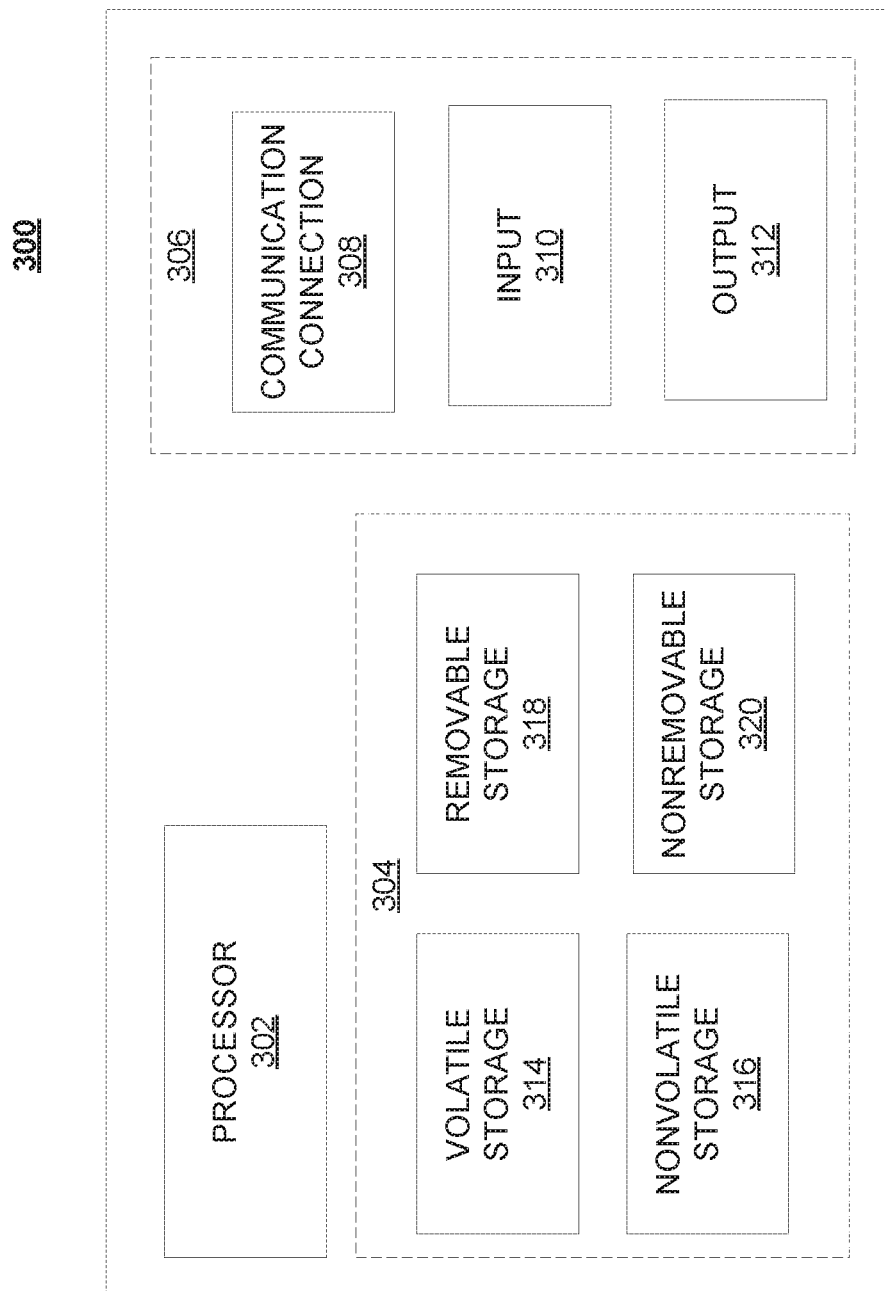

FIG. 3 is a block diagram of network device 300 that may be connected to or comprise a component of network 100 or system 200. Network device 300 may comprise hardware or a combination of hardware and software. The functionality to facilitate telecommunications via a telecommunications network may reside in one or combination of network devices 300. Network device 300 depicted in FIG. 3 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 3) to allow communications therebetween. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, Zig-Bee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a nonremovable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 4:
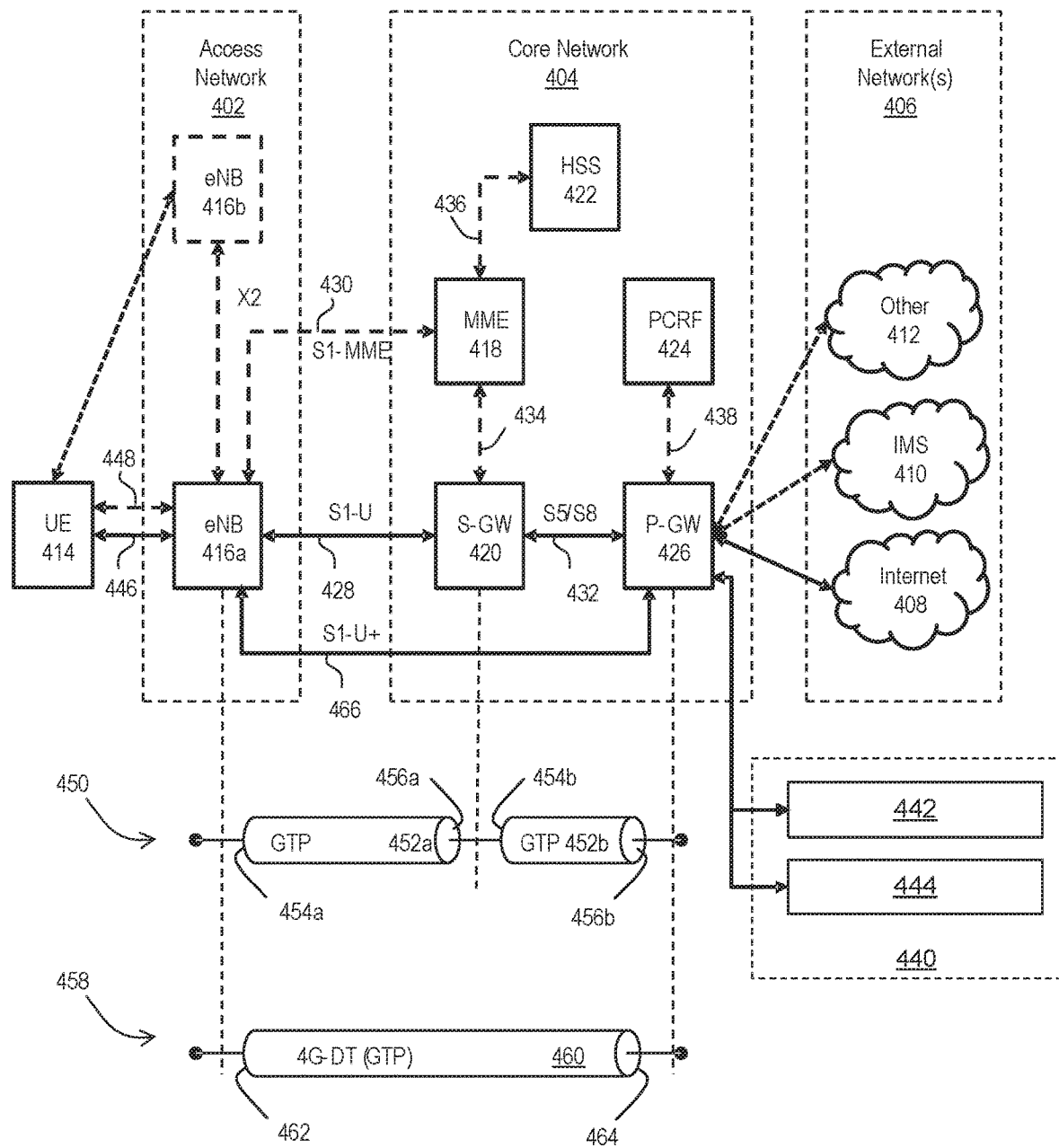
FIG. 4 depicts an exemplary communication system that provide wireless telecommunication services over wireless communication networks that may be modeled using the disclosed systems and methods for creating a graph database.

FIG. 4 illustrates a functional block diagram depicting one example of an LTE-EPS network architecture 400 related to the current disclosure. For example, network architecture 400 may include network 100. The network architecture 400 disclosed herein is referred to as a modified LTE-EPS architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. In one embodiment, the LTE-EPS network architecture 400 includes an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like. In an aspect, access network 402, core network 404, or external network 405 may include or communicate with network 100.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416a, 416b. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416a.

HSS 422 can manage subscription-related information for a user of UE 414. For example, tHSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416a and PGW 426. Notably, S1-U+ path/interface does not include SGW 420, a node that is otherwise instrumental in configuring and/or managing packet forwarding between eNB 416a and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 4. In other words, either or both of access network 402 and the core network 404 can include additional network elements that are not shown, such as various routers, switches and controllers. In addition, although FIG. 4 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416a, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426. Various signaling bearer portions are also illustrated in FIG. 4. For example, a first signaling portion (e.g., a signaling radio bearer 448) between UE 414 and eNB 416a, and a second signaling portion (e.g., S1 signaling bearer 430) between eNB 416a and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 400, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between eNB 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some embodiments, first tunnel solution 450 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. That is, SGW 420 can serve a relay function, by relaying packets between two tunnel endpoints 416a, 426. In other scenarios, direct tunneling solution 458 can forward user data packets between eNB 416a and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual bases. That is, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416a. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 5:
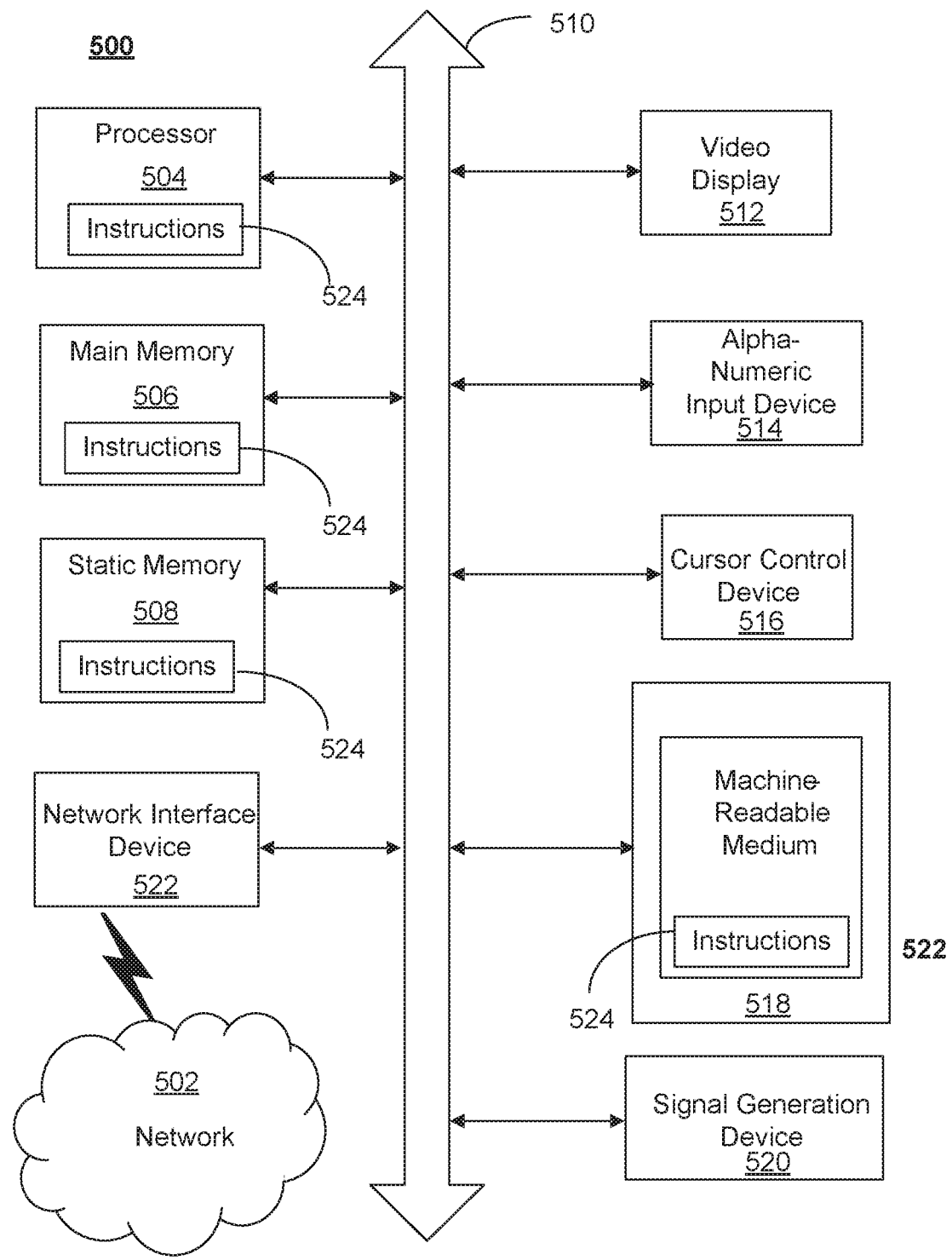
FIG. 5 depicts an exemplary communication system that provide wireless telecommunication services over wireless communication networks that may be modeled using the disclosed systems and methods for creating a graph database.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 302, UE 414, eNB 416, MME 418, SGW 420, HSS 422, PCRF 424, PGW 426 and other devices of FIGS. 1, 2, and 4. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 6:
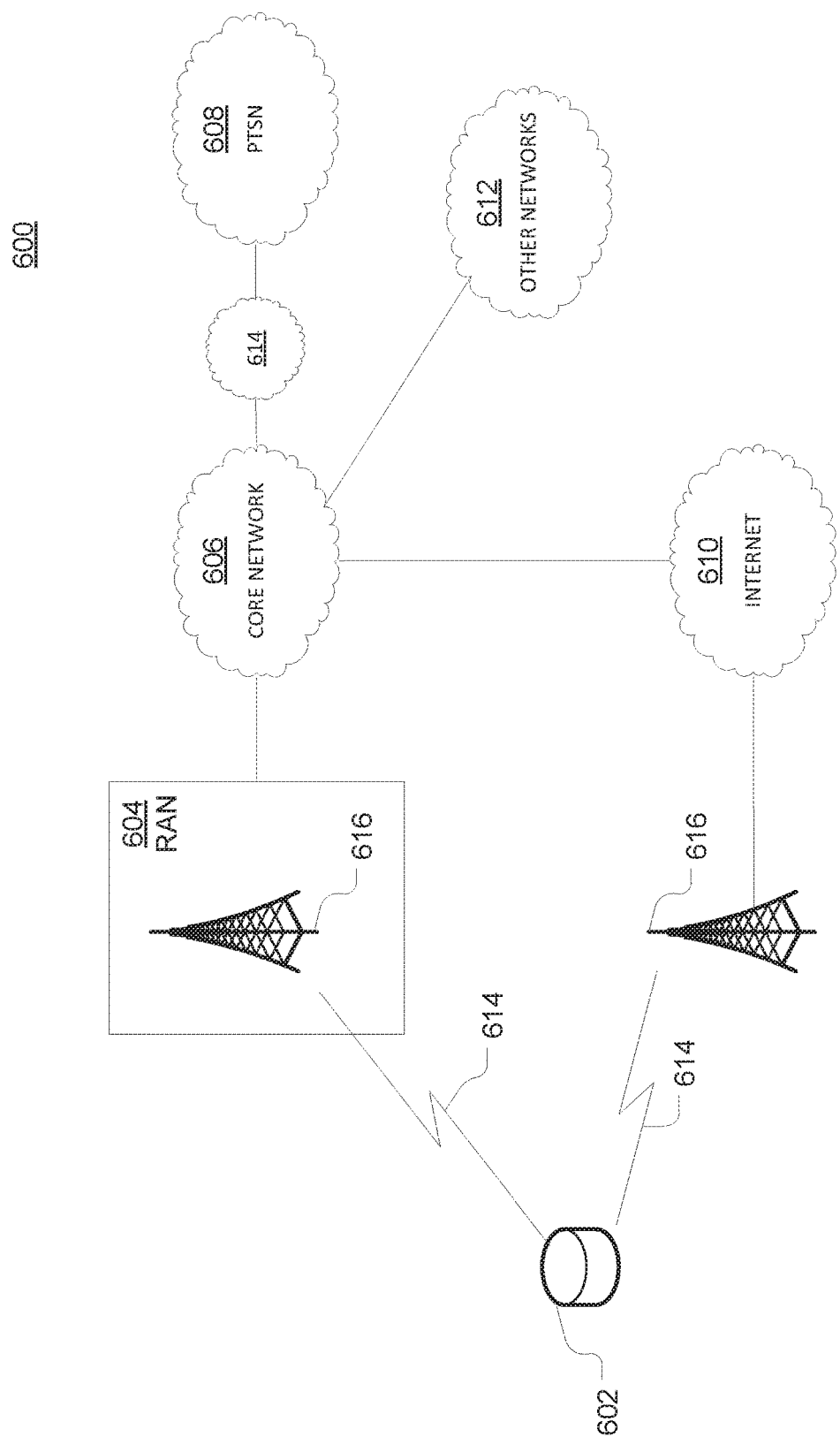
FIG. 6 is a diagram of an exemplary telecommunications system in which the disclosed methods and processes may be implemented.

As shown in FIG. 6, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise drone 102, a mobile device, network device 300, or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 6, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 6, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 7:
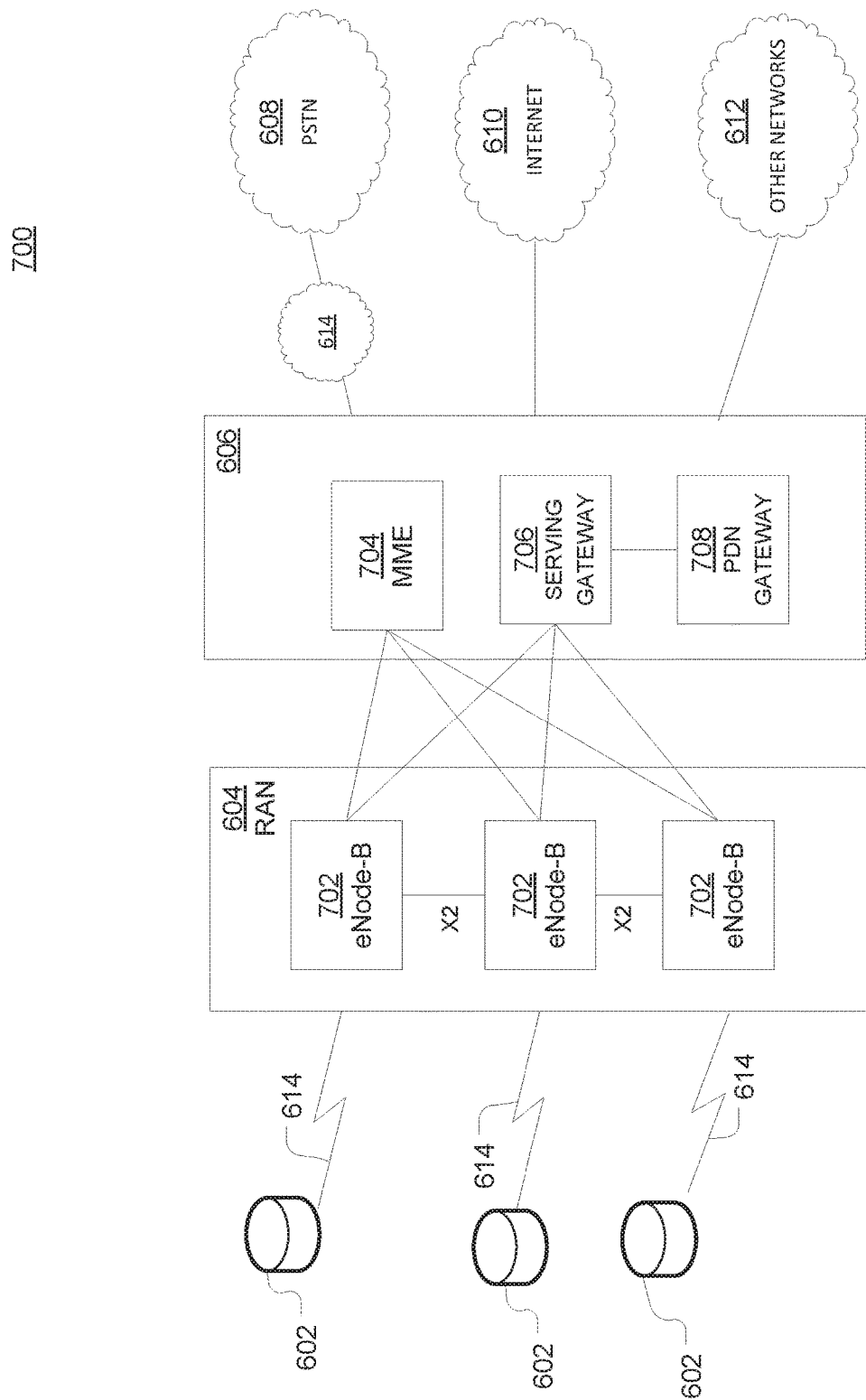
FIG. 7 is an example system diagram of a radio access network and a core network that may be modeled using the disclosed systems and methods for creating a graph database.

FIG. 7 is an example system 400 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell (not shown) and may be configured to handle radio resource management decisions, handover decisions, scheduling of users in the uplink or downlink, or the like. As shown in FIG. 7 eNode-Bs 702 may communicate with one another over an X2 interface.

Core network 606 shown in FIG. 7 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or WCDMA.

Serving gateway 706 may be connected to each of eNode-Bs 702 in RAN 604 via the S1 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WTRUs 602 and traditional landline communications devices. In addition, core network 606 may provide the WTRUs 602 with access to other networks 612, which may include other wired or wireless networks that are owned or operated by other service providers.

Figure 8:
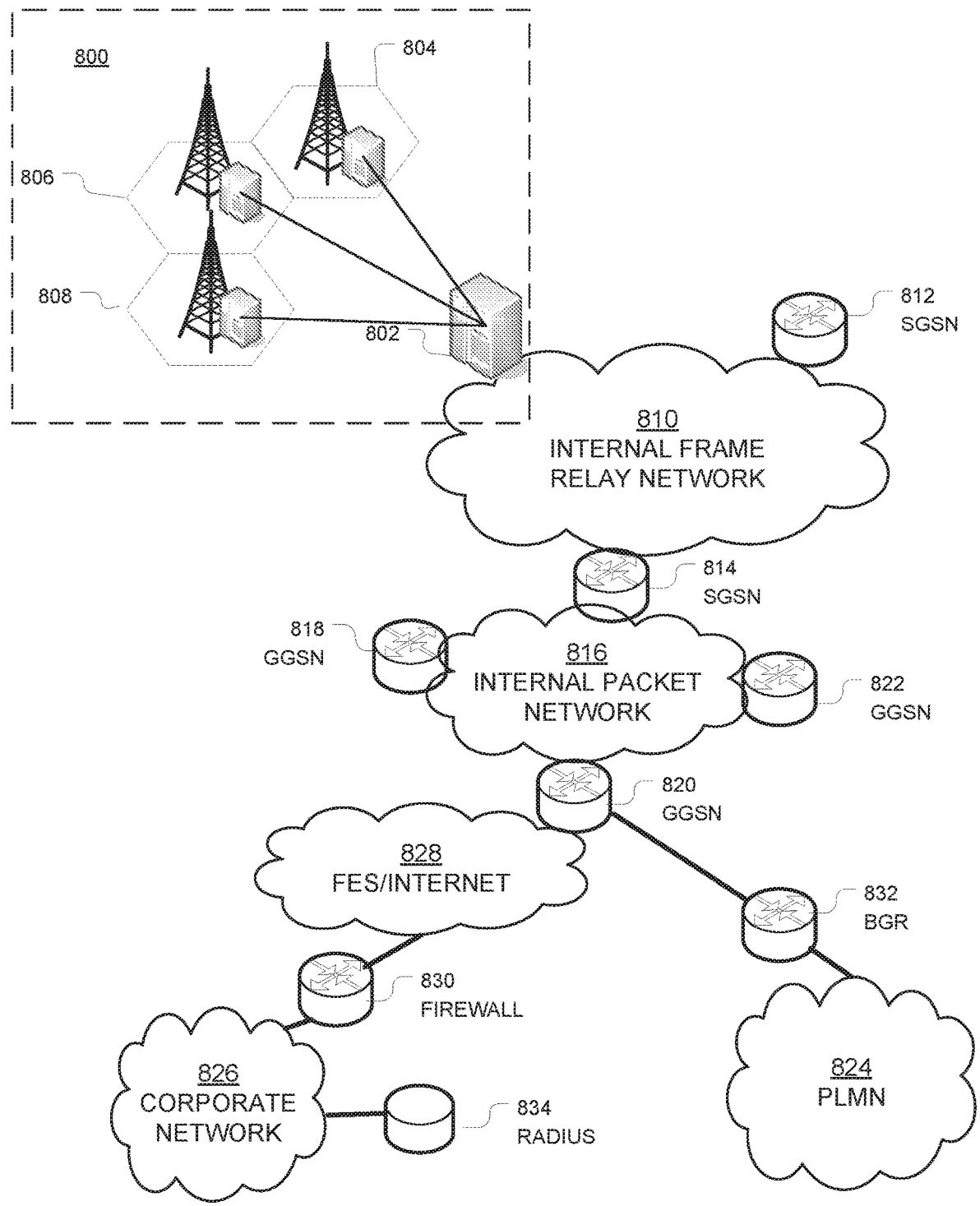
FIG. 8 depicts an overall block diagram of an example packet-based mobile cellular network environment, such as a general packet radio service (GPRS) network that may be modeled using the disclosed systems and methods for creating a graph database.

FIG. 8 depicts an overall block diagram of an example packet-based mobile cellular network environment, such as a GPRS network as described herein. In the example packet-based mobile cellular network environment shown in FIG. 8, there are a plurality of base station subsystems (BSS) 800 (only one is shown), each of which comprises a base station controller (BSC) 802 serving a plurality of BTSs, such as BTSs 804, 806, 808. BTSs 804, 806, 808 are the access points where users of packet-based mobile devices become connected to the wireless network. In example fashion, the packet traffic originating from mobile devices is transported via an over-the-air interface to BTS 808, and from BTS 808 to BSC 802. Base station subsystems, such as BSS 800, are a part of internal frame relay network 810 that can include a service GPRS support nodes (SGSN), such as SGSN 812 or SGSN 814. Each SGSN 812, 814 is connected to an internal packet network 816 through which SGSN 812, 814 can route data packets to or from a plurality of gateway GPRS support nodes (GGSN) 818, 820, 822. As illustrated, SGSN 814 and GGSNs 818, 820, 822 are part of internal packet network 816. GGSNs 818, 820, 822 mainly provide an interface to external IP networks such as PLMN 824, corporate intranets/internets 826, or Fixed-End System (FES) or the public Internet 828. As illustrated, subscriber corporate network 826 may be connected to GGSN 820 via a firewall 830. PLMN 824 may be connected to GGSN 820 via a boarder gateway router (BGR) 832. A Remote Authentication Dial-In User Service (RADIUS) server 834 may be used for caller authentication when a user calls corporate network 826.

Generally, there may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 9:
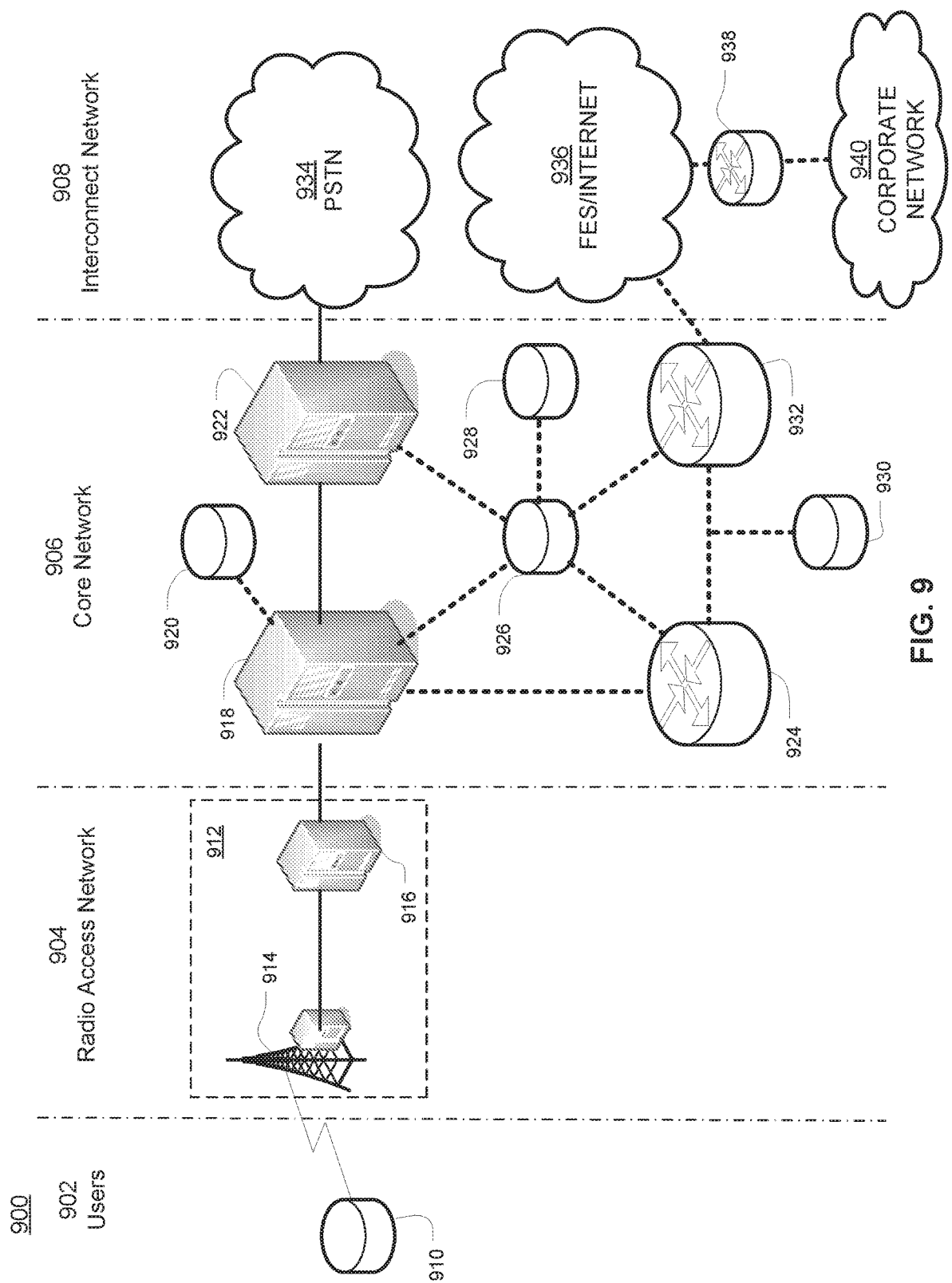
FIG. 9 illustrates an exemplary architecture of a GPRS network that may be modeled using the disclosed systems and methods for creating a graph database.

FIG. 9 illustrates an architecture of a typical GPRS network 900 as described herein. The architecture depicted in FIG. 9 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 9. In an example, device 910 comprises a communications device (e.g., mobile device 102, mobile positioning center 116, network device 300, any of detected devices 500, second device 508, access device 604, access device 606, access device 608, access device 610 or the like, or any combination thereof). Radio access network 904 comprises a plurality of BSSs such as BSS 912, which includes a BTS 914 and a BSC 916. Core network 906 may include a host of various network elements. As illustrated in FIG. 9, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 9, interconnect network 908 comprises a PSTN 934, an FES/Internet 936, a firewall 1038, or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

HLR 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 9, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 1038, to reach corporate network 940.

Figure 10:
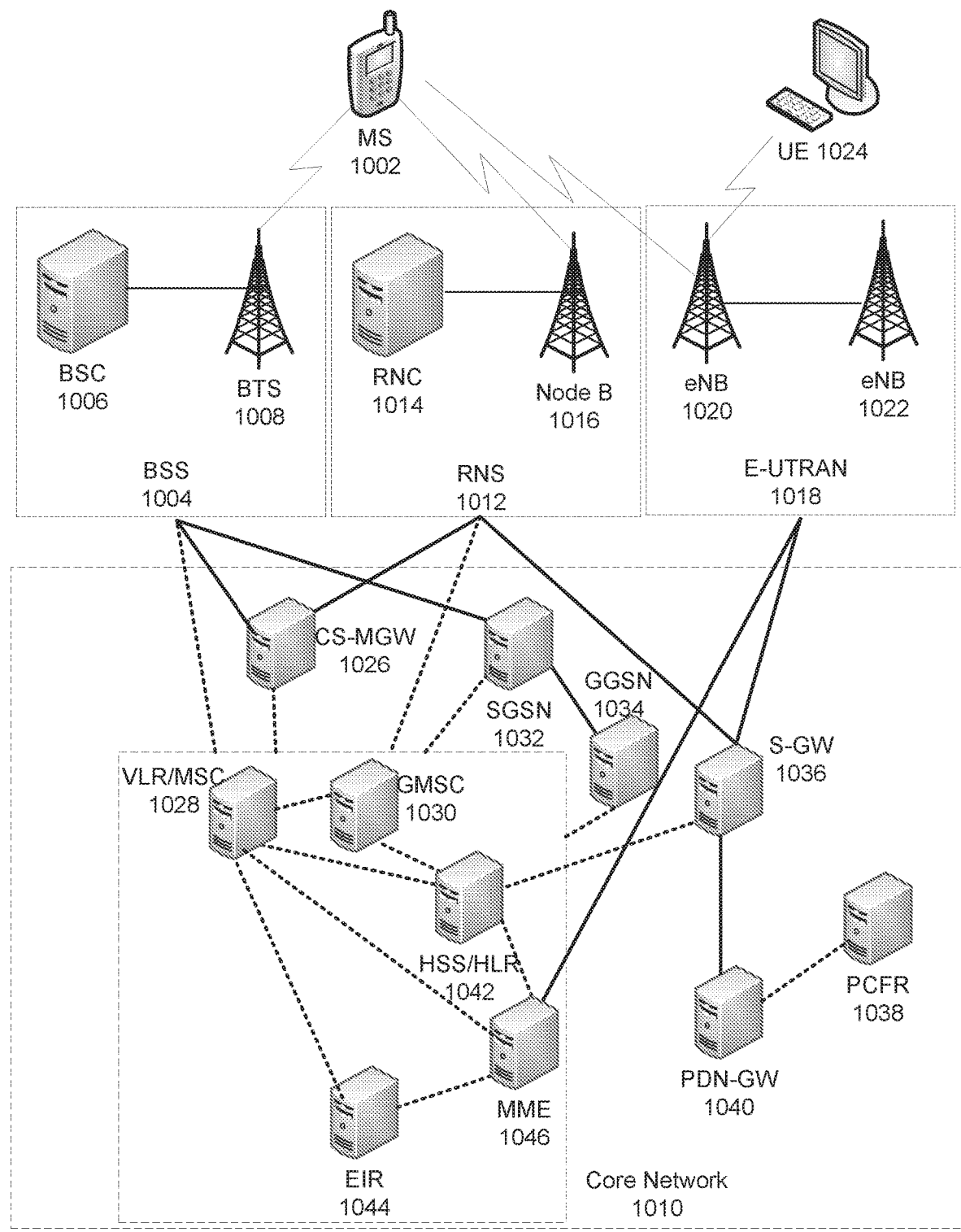
FIG. 10 is a block diagram of an exemplary public land mobile network (PLMN) that may be modeled using the disclosed systems and methods for creating a graph database.

FIG. 10 illustrates a PLMN block diagram view of an example architecture that may be replaced by a telecommunications system. In FIG. 10, solid lines may represent user traffic signals, and dashed lines may represent support signaling. MS 1002 is the physical equipment used by the PLMN subscriber. For example, drone 102, network device 300, the like, or any combination thereof may serve as MS 1002. MS 1002 may be one of, but not limited to, a cellular telephone, a cellular telephone in combination with another electronic device or any other wireless mobile communication device.

MS 1002 may communicate wirelessly with BSS 1004. BSS 1004 contains BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNBs. User equipment (UE) 1024 may be any mobile device capable of connecting to E-UTRAN 1018 including, but not limited to, a personal computer, laptop, mobile device, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically MS 1002 may communicate with any or all of BSS 1004, RNS 1012, or E-UTRAN 1018. In a illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched MGW function (CS-MGW) 1026 is part of core network 1010, and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location information such as, but not limited to, GGSN address for each GGSN 1034 where an active PDP exists. GGSN 1034 may implement a location register function to store subscriber data it receives from SGSN 1032 such as subscription or location information.

Serving gateway (S-GW) 1036 is an interface which provides connectivity between E-UTRAN 1018 and core network 1010. Functions of S-GW 1036 include, but are not limited to, packet routing, packet forwarding, transport level packet processing, or user plane mobility anchoring for inter-network mobility. PCRF 1038 uses information gathered from P-GW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS 1042 is a database for user information and stores subscription data regarding MS 1002 or UE 1024 for handling calls or data sessions. Networks may contain one HSS 1042 or more if additional resources are required. Example data stored by HSS 1042 include, but is not limited to, user identification, numbering or addressing information, security information, or location information. HSS 1042 may also provide call or session establishment procedures in both the PS and CS domains.

VLR/MSC Server 1028 provides user location functionality. When MS 1002 enters a new network location, it begins a registration procedure. A MSC server for that location transfers the location information to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. GMSC server 1030 may serve as a connection to alternate GMSC servers for other MSs in larger networks.

EIR 1044 is a logical element which may store the IMEI for MS 1002. User equipment may be classified as either "white listed" or "black listed" depending on its status in the network. If MS 1002 is stolen and put to use by an unauthorized user, it may be registered as "black listed" in EIR 1044, preventing its use on the network. A MME 1046 is a control node which may track MS 1002 or UE 1024 if the devices are idle. Additional functionality may include the ability of MME 1046 to contact idle MS 1002 or UE 1024 if retransmission of a previous session is required.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which emergency alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

The invention claimed is:

1. A system comprising:
 a graph database representative of a network inventory;
 a processor communicatively coupled to the graph database;
 memory storing instructions that cause the processor to effectuate operations, the operations comprising:
  parsing a regular pathway expression into fragments, the fragments comprising an anchored fragment and at least one other fragment, a number of the fragments based on at least a length limitation of the regular pathway expression;
  generating an operator directed acyclic graph (DAG) based on at least the fragments, the operator DAG comprising non-operator nodes, operator nodes, and a root, wherein the root is based on at least the anchored fragment;
  removing, from the operator DAG, at least one of the non-operator nodes;
  connecting, within the operator DAG, a first operator node of the operator nodes to a second operator node of the operator nodes, wherein the first operator node comprises a first edge into the removed at least one non-operator node and wherein the second operator node comprises a second edge from the removed at least one non-operator node; and
  executing the operator DAG on the graph database to generate a pathway set comprising at least one pathway that satisfies the regular pathway expression.

2. The system of claim 1, wherein the operator nodes include a selection node.

3. The system of claim 2, the operations further comprising:
 determining that no pathway from the selection node to a third operator node of the operator nodes exists; and
 prior to executing the operator DAG on the graph database, removing the third operator node from the operator DAG.

4. The system of claim 1, wherein generating the operator DAG further comprises: applying a transformation to the at least one other fragment to generate a sub-DAG, wherein the operator DAG is based on at least the sub-DAG.

5. The system of claim 4, wherein generating the operator DAG further comprises:
 generating an operator DAG comprising at least a first placeholder node associated with the anchored fragment and at least a second placeholder node associated with the at least one other fragment,
 connecting the first placeholder node to the second placeholder node with at least one non-operator node; and
 replacing the second placeholder with the sub-DAG.

6. The system of claim 4, wherein the first placeholder node comprises a forwards placeholder node.

7. The system of claim 1, wherein the at least one other fragment comprises a non-anchored fragment.

8. The system of claim 1, wherein the at least one other fragment comprises a second anchored fragment.

9. A method, comprising:
 parsing a regular pathway expression into fragments comprising an anchored fragment and a second fragment, a number of the fragments based on at least a length limitation of the regular pathway expression;
 generating an operator directed acyclic graph (DAG) based on the fragments, the operator DAG comprising a non-operator node, operator nodes, and a root, wherein the root is based on at least the anchored fragment;
 removing, from the operator DAG, the non-operator node;
 connecting, within the operator DAG, a first operator node of the operator nodes to a second operator node of the operator nodes, wherein the first operator node comprises a first edge into the removed non-operator node and wherein the second operator node comprises a second edge from the removed non-operator node; and
 executing the operator DAG on a graph database to generate a pathway set comprising at least one pathway that satisfies the regular pathway expression.

10. The method of claim 9, wherein the operator node includes a selection node.

11. The method of claim 10, further comprising:
 determining that no pathway from the selection node to a second operator node of the operator nodes exists; and
 prior to executing the operator DAG on the graph database, removing the second operator node from the operator DAG.

12. The method of claim 10, further comprising:
 determining that a union node of the operator DAG has exactly one input;
 pathway from the selection node to a second operator node of the operator nodes exists; and
 prior to executing the operator DAG on the graph database, removing the union node from the operator DAG and connecting the exactly one input node to an output node of the union node.

13. The method of claim 9, wherein generating the operator DAG further comprises:

for the second, applying a transformation to the second fragment to generate a sub-DAG, wherein the operator DAG is based on at least the sub-DAG.

14. The method of claim 9, wherein the second fragment comprises a non-anchored fragment.

15. The method of claim 9, wherein the second fragment comprises an anchored fragment.

16. The method of claim 9, wherein the graph database represents a network inventory.

17. A method comprising:

parsing a regular pathway expression into fragments, the fragments comprising an anchored fragment and at least one other fragment, a number of the fragments based on at least a length limitation of the regular pathway expression;

recursively applying one or more transformations to the fragments to generate an operator directed acyclic graph (DAG), the operator DAG comprising at least one operator node;

executing the operator DAG on a graph database to return a pathway set comprising at least one pathway that satisfies the regular pathway expression;

eliminating an extraneous node of the at least one operator node from the operator DAG; and connecting, within the operator DAG, a first operator node of the at least one operator node to a second operator node of the at least one operator node, wherein the first operator node comprises a first edge into the extraneous node and wherein the second operator node comprises a second edge from the extraneous node, wherein the extraneous node comprises a non-operator node.

18. The method of claim 17, further comprising:

determining that no pathway from a selection node to a third operator node of the operator nodes exists, wherein the third operator node comprises the extraneous node.

19. The method of claim 17, wherein the fragments comprise a non-anchored fragment.

* * * * *